United States Patent
Yoshino et al.

(10) Patent No.: US 9,964,143 B2
(45) Date of Patent: May 8, 2018

(54) FOIL BEARING AND METHOD FOR MANUFACTURING THEREOF

(71) Applicant: NTN CORPORATION, Osaka (JP)

(72) Inventors: Masato Yoshino, Mie (JP); Hiroki Fujiwara, Mie (JP)

(73) Assignee: NTN CORPORATION, Osaka (JP)

(*) Notice: Subject to any disclaimer, the term of this patent is extended or adjusted under 35 U.S.C. 154(b) by 0 days. days.

(21) Appl. No.: 15/103,002

(22) PCT Filed: Nov. 19, 2014

(86) PCT No.: PCT/JP2014/080678
§ 371 (c)(1),
(2) Date: Jun. 9, 2016

(87) PCT Pub. No.: WO2015/087677
PCT Pub. Date: Jun. 18, 2015

(65) Prior Publication Data
US 2016/0356310 A1    Dec. 8, 2016

(30) Foreign Application Priority Data

Dec. 12, 2013  (JP) ................................. 2013-256848
Jan. 10, 2014  (JP) ................................. 2014-003584
Jan. 14, 2014  (JP) ................................. 2014-004266

(51) Int. Cl.
*F16C 17/02* (2006.01)
*F16C 17/10* (2006.01)
(Continued)

(52) U.S. Cl.
CPC .......... *F16C 17/024* (2013.01); *F16C 17/042* (2013.01); *F16C 17/10* (2013.01); *F16C 43/02* (2013.01); *F16C 2360/24* (2013.01)

(58) Field of Classification Search
CPC ............................. F16C 17/024; F16C 17/042
See application file for complete search history.

(56) References Cited

U.S. PATENT DOCUMENTS 4,348,066 A    9/1982    Agrawal et al.
6,261,002 B1 *  7/2001    Ermilov ................ F16C 17/024
                                                        384/105
(Continued)

FOREIGN PATENT DOCUMENTS

GB    2 323 898    10/1998
GB    2 323 989    10/1998
(Continued)

OTHER PUBLICATIONS

International Search Report dated Feb. 17, 2015 in International (PCT) Application No. PCT/JP2014/080678.
(Continued)

*Primary Examiner* — Thomas R Hannon
(74) *Attorney, Agent, or Firm* — Wenderoth, Lind & Ponack, L.L.P.

(57) ABSTRACT

A foil bearing (thrust foil bearing (40)) includes a foil holder (41) and a plurality of foils (42) arrayed in a circumferential direction. Each of the foils (42) includes a body portion (42a) having a thrust bearing surface (S2) and an extended portion (42b) extending from the body portion (42a) to a radially outer side. An end portion (42d) of the body portion (42a) of each of the foils (42) on one circumferential side is arranged so as to be overlapped on the body portion (42a) of adjacent one of the foils (42). The extended portions (42b) of the plurality of foils (42) are fixed onto the same plane of the foil holder (41).

14 Claims, 31 Drawing Sheets

(51) Int. Cl.
*F16C 17/04* (2006.01)
*F16C 43/02* (2006.01)

(56) References Cited

U.S. PATENT DOCUMENTS

| 6,997,613 | B2* | 2/2006 | Katou ................ F16C 17/024 |
| | | | 384/106 |
| 2003/0118257 | A1 | 6/2003 | Lee et al. |
| 2006/0045396 | A1 | 3/2006 | Kim et al. |
| 2014/0169707 | A1 | 6/2014 | Yoshino |
| 2014/0226925 | A1 | 8/2014 | Yoshino et al. |

FOREIGN PATENT DOCUMENTS

| JP | 55-166525 | 12/1980 |
| JP | 59-155321 | 10/1984 |
| JP | 61-36725 | 3/1986 |
| JP | 61-38321 | 3/1986 |
| JP | 63-195412 | 8/1988 |
| JP | 2006-52837 | 2/2006 |
| JP | 2011-144845 | 7/2011 |
| JP | 2012-92967 | 5/2012 |
| JP | 2013-53645 | 3/2013 |
| JP | 2013-61024 | 4/2013 |
| JP | 2013-79719 | 5/2013 |
| RU | 2 496 032 | 3/2013 |
| SU | 830030 | 5/1981 |

OTHER PUBLICATIONS

International Preliminary Report on Patentability & Written Opinion of the International Searching Authority dated Jun. 14, 2016 in corresponding International Application No. PCT/JP2014/080678.
Supplemental European Search Report dated Jul. 3, 2017 in counterpart European Patent Application No. 14869500.0.

* cited by examiner

FOIL BEARING AND METHOD FOR MANUFACTURING THEREOF

TECHNICAL FIELD

The present invention relates to a thrust foil bearing, a radial foil bearing, and a method of manufacturing the thrust foil bearing and the radial foil bearing.

BACKGROUND ART

Bearings configured to support main shafts of turbo machines, such as a gas turbine and a turbocharger, are required to endure severe environments involving high temperature and high speed rotation. Attention has been focused on a foil bearing as a bearing suited to use under such conditions. The foil bearing has bearing surfaces formed of flexible thin films (foils) having low flexural rigidity, and is configured to support a load by allowing the bearing surfaces to be deflected. During the rotation of the shaft, fluid films (such as air films) are formed between an outer peripheral surface of the shaft and the bearing surfaces of the foils, and the shaft is supported in a non-contact manner.

A reaction force of an airflow generated by high speed rotation of the turbine in thrust directions is applied to the shafts of the gas turbine and a supercharger. Therefore, the shafts are required to be supported not only in a radial direction but also in the thrust directions. For example, in Patent Literatures 1 to 3, there is described a leaf-type thrust foil bearing as a type of thrust boil bearings configured to support a rotary member (thrust collar) in the thrust directions. The thrust foil bearing includes a plurality of leaves provided at a plurality of circumferential positions on an end surface of a disc-like foil holder. One circumferential end of each of the leaves is set as a free end, whereas another circumferential end of each of the leaves is fixed to an end surface of a fixing member. When the rotary member is rotated, a thrust bearing gap is formed between a bearing surface of each of the leaves and an end surface of the rotary member, which is opposed thereto. With a fluid film in the thrust bearing gap, the rotary member is supported in the thrust directions in a non-contact manner.

In the thrust foil bearing described above, the leaves are provided so as to be separated from each other in the circumferential direction. Therefore, regions between the leaves in the circumferential direction do not function as the bearing surfaces, resulting in a fear of insufficient supportability. Further, in the thrust foil bearing described above, a back foil (bump foil, spring foil) is provided below the leaves so as to apply an elastic force to the leaves, thereby adjusting the gap (thrust bearing gap) between the bearing surface of each of the leaves and the rotary member. By providing the back foil as described above, however, the number of components is increased, resulting in higher cost.

For example, in a thrust foil bearing 310 described in Patent Literature 4, an end portion 312a of each of foils 312 on one circumferential side (on a downstream side in a rotation direction of a shaft) is set as a free end, as illustrated in FIG. 42. The end portion 312a is arranged so as to be overlapped on adjacent one of the foils 312. A region including the end portion 312a of each of the foils 312 on the one circumferential side forms a top foil portion A' having a thrust bearing surface S1'. A region including an end portion 312b of each of the foils 312 on another circumferential side forms a back foil portion B' configured to support the top foil portion A' of the adjacent one of the foils 312 from behind (lower side in FIG. 42).

As described above, by overlapping the adjacent foils 312, the thrust bearing surfaces S1' can be provided continuously over the entire periphery. At the same time, the back foil can be omitted to reduce the cost. Further, in the thrust foil bearing, radially outer rims of the leaves are coupled by a ring-shaped coupling portion, and the coupling portion is fixed to a foil holder. Therefore, below the leaf that forms the bearing surface, a fixing portion between another one of the leaves and the foil holder is not provided. The leaves are fixed to the foil holder with a fixing member, through welding, or by other methods. Hence, concavity and convexity are generally formed at the fixing portion. By the absence of the fixing portion below the bearing surface as described above, it is possible to prevent a risk of adverse effects of the concavity and convexity of the fixing portion on the bearing surface so as to prevent reduction in supportability.

Further, in Patent Literature 5, there is described a foil bearing (radial foil bearing) including foils 512 as illustrated in FIG. 53. One circumferential end portion (hereinafter referred to as "front end 512a") of each of the foils 512 and another circumferential end portion (hereinafter referred to as "rear end 512b") of each of the foils 512 are inclined axially inward from both axial ends toward one circumferential side (downstream side in the rotation direction of the shaft) to form a so-called herringbone pattern. As illustrated in FIG. 54, the front end 512a of each of the foils 512 is formed as a free end so that a region including the front end 512a of each of the foils 512 functions as a top foil portion A' having a bearing surface. A region including the rear end 512b of each of the foils 512 functions as a back foil portion B' configured to support the top foil portion A' of the adjacent one of the foils 512 from behind. Although a plurality of the foils 512 are coupled by a coupling portion in Patent Literature 5, the coupling portion is omitted in FIG. 53. In FIG. 53, only the three foils 512, which are arranged so that the foils 512 are slightly shifted in the axial direction (vertical direction in the figures), are illustrated for easy understanding.

CITATION LIST

Patent Literature 1: Japanese Utility Model Application Laid-open No. Sho 61-36725
Patent Literature 2: Japanese Utility Model Application Laid-open No. Sho 61-38321
Patent Literature 3: Japanese Patent Application Laid-open No. Sho 63-195412
Patent Literature 4: Japanese Patent Application Laid-open No. 2013-61024
Patent Literature 5: Japanese Patent Application Laid-open No. 2013-79719

SUMMARY OF INVENTION

Technical Problem

The thrust foil bearing of Patent Literature 4 is assembled by the following procedure. First, as illustrated in an upper part of FIG. 22, two foil members 130 and 130' respectively obtained by coupling a plurality of leaves 131 and 131' by ring-shaped coupling portions 132 and 132' are prepared. Then, the two foil members 130 and 130' are overlapped while each of the leaves 131 and 131' overrides on adjacent one of the leaves 131' and 131 (see a middle part and a lower part of FIG. 22). The thus overlapped two foil members 130 and 130' are fixed to a foil holder 120 (see FIG. 23). In this case, the leaves 131 of the underlying foil member 130 override on the leaves 131' of the overlying foil member 130' to be curved. As a result, the thrust bearing gap that is gradually decreased to one circumferential side (downstream side in the rotation direction of the shaft) is formed between a bearing surface 131c of each of the leaves 131 and a rotary member 106. Further, the leaves 131 are curved to apply an elastic force, thereby being capable of fulfilling a function of adjusting the thrust bearing gap.

On the other hand, the leaves 131' of the overlying foil member 130' (in particular, radially outer portions of the leaves 131') are arranged so as to be located above the leaves 131 of the underlying foil member 130. Therefore, the leaves 131' of the overlying foil member 130' are scarcely curved as illustrated in FIG. 23, resulting in a fear that bearing surfaces 131c' may become approximately flat in the circumferential direction. In this case, the thrust bearing gap that is formed between the approximately flat bearing surface 131c' and the rotary member 106 becomes approximately constant in the circumferential direction. Hence, a fluid pressure in the thrust bearing gap does not become sufficiently high, resulting in a fear of reduction in supportability. Further, when the leaves 131' are not curved, a sufficient elastic force is not applied to the leaves 131'. Thus, the function of adjusting the thrust bearing gap does not work, still resulting in the reduction in supportability.

The problems described above may occur not only in the thrust foil bearings but also in the radial foil bearings in a similar manner.

The present invention has a first object to enhance supportability of the foil bearing.

In the foil bearing 310 illustrated in FIG. 42, when a thrust collar 301 is rotated in a direction of the arrow, a thrust bearing gap T' is formed between the thrust bearing surface S1' of each the foils 312 and an end surface 301a of the thrust collar 301. At this time, the top foil portion A' of each of the foils 312 overrides on the back foil portion B' of the adjacent one of the foils 312, resulting in a varying size of the thrust bearing gap T' depending on a location. Specifically, the thrust bearing gap having a relatively small gap width (small gap portion T1') is formed between a portion (front portion A1') of the top foil portion A' of each of the foils 312, which overrides on the back foil portion B' of the adjacent one of the foils 312, and the thrust collar 301. On the other hand, the thrust bearing gap having a relatively large gap width (large gap portion T2') is formed between a portion (rear portion A2') of the top foil portion A' of each of the foils 312, which does not override on the back foil portion B' of the adjacent one of the foils 312, and the thrust collar 301. In this case, immediately after a pressure of a fluid in the thrust bearing gap T' is increased in the small gap portion T1', the pressure is suddenly decreased in the large gap portion T2'. Therefore, a negative pressure is generated in the fluid present in the large gap portion T2', resulting in a fear of reduction in load capacity of the thrust foil bearing 310. In particular, when a viscosity of the fluid is small or a rotation speed of the sheet is high, there is a greater fear of generation of the negative pressure.

The above-mentioned problem occurs not only in the thrust foil bearings but also in the radial foil bearings in a similar manner.

The present invention has a second object to prevent the generation of the negative pressure in the bearing gap so as to prevent the reduction in load capacity in the foil bearing in which the one circumferential end portion of each of the foils is arranged so as to be overlapped on the adjacent one of the foils.

When a shaft 502 that is supported by the foil bearing illustrated in FIG. 53 and FIG. 54 is rotated, the pressure of the fluid in the bearing gap is increased. By the fluid pressure, the top foil portion A' of each of the foils 512 is pressed against the back foil portion B' located behind the top foil portion A'. Thus, as illustrated in FIG. 55, the top foil portion A' of each of the foils 512 is curved along the rear end 512b having the herringbone pattern, which is formed on the back foil portion B'. As a result, each of the foils 512 is deformed into a boat-like shape so that a distal end and both axial ends of the top foil portion A' are warped upward from an axial center portion B1' of the back foil portion B' as a bottom. As described above, the deformation of each of the foils 512 into the boat-like shape allows collection of the fluid flowing through the bearing gap in the axial center portion along the bearing surface (see the arrows in the chain lines) to efficiently increase the fluid pressure.

When each of the foils 512 is curved into the boat-like shape as described above, a compressive stress is applied to the axial center portion B1' of the back foil portion B' from both axial sides. At this time, the axial center portion B1' is stretched to inhibit the deformation of the back foil portion B'. In particular, when the fluid pressure in the bearing gap is relatively low during low speed rotation of the shaft, there is a fear in that each of the foils 512 cannot be deformed into the boat-like shape.

The problem described above occurs not only in the radial foil bearings configured to support the shaft in the radial direction but also in the thrust foil bearings configured to support the thrust collar provided to the shaft in the thrust directions in a similar manner.

The present invention has a third object to deform each of the foils of the foil bearing into a desired shape during rotation of the shaft so as to efficiently increase the fluid pressure.

Solution to Problem

First Aspect of the Present Invention

In order to attain the above-mentioned first object, according to a first aspect of the present invention, there is provided a foil bearing (thrust foil bearing), comprising: a foil holder; and a plurality of foils mounted to the foil holder so as to be arrayed in a circumferential direction of the foil holder, the foil bearing being configured to support a shaft in thrust directions of the shaft, the shaft being rotatable relatively to one side in the circumferential direction, each of the plurality of foils comprising: a body portion having a bearing surface; and an extended portion extending from the body portion to a radially outer side, an end portion of the body portion of the each of the plurality of foils on one circumferential side being arranged so as to be overlapped on the body portion of adjacent one of the plurality of foils, the extended portions of the plurality of foils being fixed onto the same plane of the foil holder.

Further, in order to attain the above-mentioned first object, according to the first aspect of the present invention, there is provided a foil bearing (radial foil bearing), comprising: a foil holder; and a plurality of foils mounted to an inner peripheral surface of the foil holder so as to be arrayed in a circumferential direction of the foil holder, the foil bearing being configured to support a shaft in a radial direction of the shaft, the shaft being rotatable relatively to one side in the circumferential direction, each of the plurality of foils comprising: a body portion having a bearing surface; and an extended portion extending from the body portion to one axial side, an end portion of the body portion of the each of the plurality of foils on one circumferential side being arranged so as to be overlapped on the body portion of adjacent one of the plurality of foils, the extended portions of the plurality of foils being fixed onto the same cylindrical surface of the foil holder.

As described above, the extended portion of each of the foils is fixed onto the same plane (or the same cylindrical surface) of the foil holder. As a result, all the foils respectively override on the adjacent foils to be curved in a similar manner. With this, a bearing gap that is gradually decreased toward the one circumferential side (upstream side in a relative rotation direction of the shaft) is formed between a bearing surface of each of the foils and a rotary member to be supported. Further, each of the foils is curved in a similar manner, thereby applying a sufficient elastic force to each of the foils. Therefore, the elastic force allows a function of adjusting the bearing gap to be fulfilled.

For example, in an example illustrated in FIG. 14, an extended portion 42b of a foil 42 extends from a body portion 42a to the radially outer side along a radial direction. A radially outer portion (indicated by the crosshatching) of the extended portion 42b is fixed to a foil holder (holder body 41a). In this case, the body portion 42a of the foil 42 is pulled to the one circumferential side (direction indicated by the arrow) by a flow of a fluid, which is caused along with the rotation of the shaft. As a result, a shearing force is applied to a radially inner portion P of the extended portion 42b, thereby causing a fear of damaging the foils. On the other hand, in an example illustrated in FIG. 7, the extended portion 42b of the foil 42 extends from the body portion 42a to the radially outer side in a direction inclined to another circumferential side. The radially outer portion (indicated by the crosshatching) of the extended portion 42b is fixed to the foil holder 41. In this case, when the foil is pulled to the one circumferential side along with the rotation of the shaft, a direction of the force applied to the radially inner portion P1 of the extended portion 42b is mainly equal to a tensile direction. Therefore, the shearing force applied to the radially inner portion P1 can be reduced, thereby being capable of preventing the damage to the foils.

For example, the thrust foil bearing described above may be manufactured by the following steps in the following order: forming a plurality of foil members, each of the plurality of foil members comprising a plurality of foils, each of the plurality of foils comprising a body portion having a bearing surface and an extended portion extending from the body portion to a radially outer side, and a coupling portion provided on a radially outer side with respect to the plurality of foils and configured to couple the extended portions of the plurality of foils; overlapping the plurality of foil members so that an end portion of the body portion on one circumferential side is arranged so as to be overlapped on the adjacent body portion; fixing the extended portions of the plurality of foil members onto the same plane of a foil holder; and separating the coupling portions of the plurality of foil members from the plurality of foils.

Further, for example, the radial foil bearing described above may be manufactured by the following steps in the following order: forming a plurality of foil members, each of the plurality of foil members comprising a plurality of foils, each of the plurality of foils comprising a body portion having a bearing surface and an extended portion extending from the body portion to one axial side, and a coupling portion provided on one axial side with respect to the plurality of foils and configured to couple the extended portions of the plurality of foils; overlapping the plurality of foil members so that an end portion of the body portion of the each of the plurality of foil members on one circumferential side is arranged so as to be overlapped on the body portion of adjacent one of the plurality of foil members; fixing the extended portions of the plurality of foil members onto the same cylindrical surface of a foil holder; and separating the coupling portions of the plurality of foil members from the plurality of foils.

The foil member obtained by coupling the plurality of foils by the coupling portion is mounted to the foil holder as described above. As a result, as compared with a case where the foils are mounted to the foil holder one by one, assembly steps are simplified to enable increased productivity.

In the manufacturing method described above, when a circumferential dimension of a boundary between the coupling portion and the extended portion of the foil member is set smaller than a circumferential dimension of an end portion of the extended portion (radially outer rim in the case of the thrust foil bearing, end portion on the one axial side in the case of the radial foil bearing), the coupling portion and the foils can be easily separated from each other.

Second Aspect of the Present Invention

Further, in order to attain the above-mentioned second object, according to a second aspect of the present invention, there is provided a foil bearing (thrust foil bearing), comprising: a foil holder axially facing a thrust collar provided on a shaft rotatable to one side in a circumferential direction of the foil holder; and a plurality of foils mounted to an end surface of the foil holder so as to be arrayed in the circumferential direction, wherein each of the plurality of foils has an end portion on one circumferential side, which is set as a free end, wherein a region including the end portion of the each of the plurality of foils on the one circumferential side forms a top foil portion having a thrust bearing surface, wherein a region including an end portion of the each of the plurality of foils on another circumferential side forms a back foil portion configured to support the top foil portion of adjacent one of the plurality of foils from behind, wherein the foil bearing is configured to support the shaft so as to be freely rotatable in thrust directions of the shaft under a fluid pressure in a thrust bearing gap formed between the thrust bearing surface and an end surface of the thrust collar, wherein the thrust bearing gap has a small gap portion formed between a region of the top foil portion of the each of the plurality of foils, which includes an end portion of the top foil portion on the one circumferential side and the end surface of the thrust collar, wherein the thrust bearing gap has a large gap portion formed between a region of the top foil portion of the each of the plurality of foils, which includes an end portion of the top foil portion on the another circumferential side, and the end surface of the thrust collar, and wherein the foil bearing has a communication path configured to bring the large gap portion and a space between the each of the plurality of foils and the foil holder into communication with each other.

Further, in order to attain the above-mentioned second object, according to the second aspect of the present invention, there is provided a foil bearing (radial foil bearing), comprising: a foil holder having a shaft inserted along an inner periphery thereof; and a plurality of foils mounted to an inner peripheral surface of the foil holder so as to be arrayed in a circumferential direction of the foil holder, wherein each of the plurality of foils has an end portion on one circumferential side, which is set as a free end, wherein a region including the end portion of the each of the plurality of foils on the one circumferential side forms a top foil portion having a radial bearing surface, wherein a region including an end portion of the each of the plurality of foils on another circumferential side forms a back foil portion configured to support adjacent one of the plurality of foils from behind, wherein the foil bearing is configured to support the shaft so as to be freely rotatable in a radial direction of the shaft under a fluid pressure in a radial bearing gap formed between the radial bearing surface and an outer peripheral surface of the shaft, wherein the radial bearing gap has a small gap portion formed between a region of the top foil portion of the each of the plurality of foils, which includes an end portion of the top foil portion on the one circumferential side, and the outer peripheral surface of the shaft, wherein the radial bearing gap has a large gap portion formed between a region of the top foil portion of the each of the plurality of foils, which includes an end portion of the top foil portion on the another circumferential side, and the outer peripheral surface of the shaft, and wherein the foil bearing has a communication path configured to bring the large gap portion and a space between the each of the plurality of foils and the foil holder into communication with each other.

As described above, in the foil bearing according to the second aspect of the present invention, the large gap portion of the bearing gap and the space between the foil and the foil holder are brought into communication with each other through the communication path. As a result, the large gap portion is constantly kept in a state at a pressure close to an atmospheric pressure. Therefore, the generation of a negative pressure in the large gap portion can be prevented so as to prevent reduction in load capacity of the foil bearing.

The communication path may be formed, for example, between the top foil portion of each of the foils and the back foil portion configured to support the top foil portion from behind. More specifically, for example, a support member is provided between the top foil portion of each of the foils and the back foil portion configured to support the top foil portion from behind so that the communication path may be formed in the support member (see FIG. 27 and FIG. 28). Alternatively, a groove is formed on at least one of a surface of the top foil portion of each of the foils or a surface of the back foil portion configured to support the top foil portion from behind, which face each other, so that the groove may form the communication path (see FIG. 29).

Besides, a through hole passing in a thickness direction is formed in the foil so that the through hole may form the communication path. Further, a cutout is formed in the foil so that the cutout may form the communication path.

Third Aspect of the Present Invention

In order to attain the above-mentioned third object, according to a third aspect of the present invention, there is provided a foil bearing (radial foil bearing), comprising: a foil holder having a shaft inserted along an inner periphery thereof and rotatable to one side in a circumferential direction of the foil holder; and a plurality of foils mounted to an inner peripheral surface of the foil holder so as to be arrayed in the circumferential direction, wherein each of the plurality foils has an end portion on one circumferential side, which is set as a free end, wherein a region including the end portion of the each of the plurality foils on the one circumferential side forms a top foil portion having a radial bearing surface, wherein a region including an end portion of the each of the plurality foils on another circumferential side forms a back foil portion configured to support the top foil portion of adjacent one of the plurality foils from behind, wherein the end portion of the each of the plurality foils on the another circumferential side comprises a pair of inclined portions extending from both axial end sides toward an axial center so as to be inclined to the one circumferential side, and wherein the back foil portion of the each of the plurality foils comprises a fragile portion formed in an axially intermediate portion thereof and having lower strength to a compressive stress than regions on both axial sides of the fragile portion.

Further, in order to attain the above-mentioned third object, according to the third aspect of the present invention, there is provided a foil bearing (thrust foil bearing), comprising: a foil holder axially facing a thrust collar provided on a shaft rotatable to one side in a circumferential direction of the foil holder; and a plurality of foils mounted to an end surface of the foil holder so as to be arrayed in the circumferential direction, wherein each of the plurality foils has an end portion on one circumferential side, which is set as a free end, wherein a region including the end portion of the each of the plurality foils on the one circumferential side forms a top foil portion having a thrust bearing surface, wherein a region including an end portion of the each of the plurality foils on another circumferential side forms a back foil portion configured to support the top foil portion of adjacent one of the plurality foils from behind, wherein the end portion of the each of the plurality foils on the another circumferential side comprises a pair of inclined portions extending from both radial end sides toward an radial center so as to be inclined to the one circumferential side, and wherein the back foil portion of the each of the plurality foils comprises a fragile portion formed in a radially intermediate portion thereof and having lower strength to a compressive stress than regions on both radial sides of the fragile portion.

As described above, in the foil bearing according to the third aspect of the present invention, the fragile portion is formed in the intermediate portion (axially intermediate portion in the case of the radial foil bearing, radially intermediate portion in the case of the thrust foil bearing) of the back foil portion of each of the foils. Specifically, the fragile portion is formed in the intermediate portion of the back foil portion of each of the foils, to which the compressive stress is applied when each of the foils is pressed against the end portion (inclined portions) having the herringbone pattern, which is formed on the back foil portion located behind the foil by a fluid pressure generated in the bearing gap along with the rotation of the shaft. As a result, even when the fluid pressure in the bearing gap is relatively low, the fragile portion of each of the foils can be easily compressively deformed. Thus, each of the foils can be deformed into a desired shape (boat-like shape).

For example, the fragile portion may be formed by forming a slit extending in the circumferential direction in the back foil portion. In this case, when inner walls of the slit, which face each other, are separated from each other, the fragile portion can be easily deformed by bringing both the inner walls closer to each other when the compressive pressure is applied to the fragile portion. Further, the end portion of the back foil portion on the another circumferential side is particularly susceptible to the compressive stress. Therefore, it is preferred that the above-mentioned slit be formed so as to reach the end portion of each of the foils on the another circumferential side.

Advantageous Effects of Invention

As described above, according to the foil bearing of the first aspect of the present invention, the extended portions of the plurality of foils are fixed onto the same plane or the same cylindrical surface of the foil holder, thereby curving all the foils in a similar manner. As a result, all the foils form the bearing gap that is gradually decreased toward the one circumferential side, while a function of adjusting the bearing gap is provided. Therefore, supportability can be enhanced.

Further, according to the foil bearing of the second aspect of the present invention, by forming the communication path, the generation of the negative pressure in the bearing gap (in particular, the large gap portion) can be prevented to enable the prevention of reduction in load capacity.

Further, according to the foil bearing of the third aspect of the present invention, by forming the fragile portion in the back foil portion of each of the foils, each of the foils can be deformed into a desired shape during the rotation of the shaft to enable efficient increase in fluid pressure.

DESCRIPTION OF EMBODIMENTS

Now, embodiments of a first aspect of the present invention are described with reference to FIG. 1 to FIG. 21.

Figure 1:
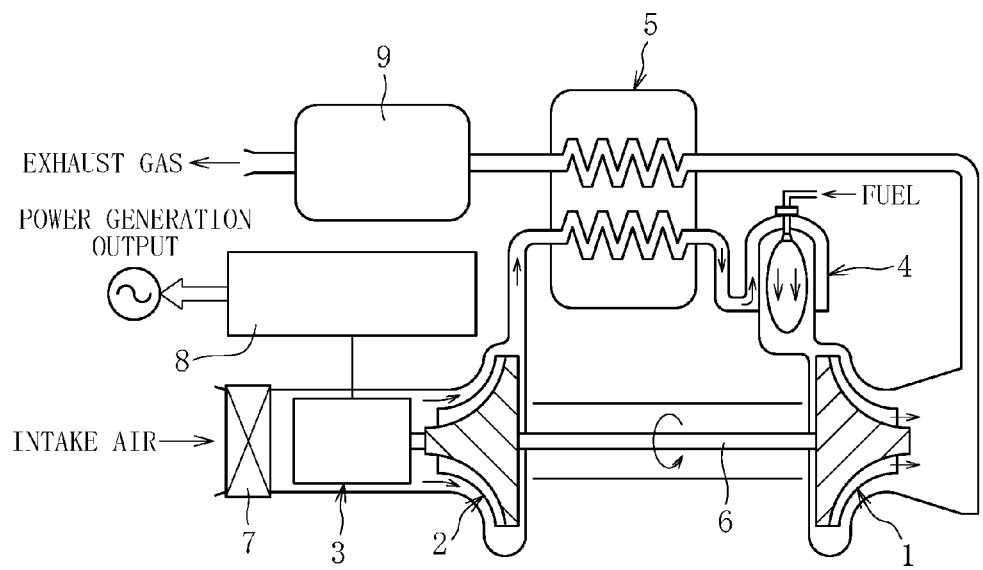
FIG. 1 is a schematic view for illustrating a configuration of a gas turbine.

FIG. 1 is a schematic illustration of a configuration of a gas turbine as a type of a turbo machine. The gas turbine mainly comprises a turbine 1 and a compressor 2, which comprise blade cascades, a power generator 3, a combustor 4, and a regenerator 5. The turbine 1, the compressor 2, and the power generator 3 comprise a common shaft 6 extending in a horizontal direction. The shaft 6, the turbine 1, and the compressor 2 serve as an integrally rotatable rotor. Air sucked from an air-intake port 7 is compressed by the compressor 2, heated by the regenerator 5, and then fed into the combustor 4. The compressed air is mixed with fuel and combusted so as to rotate the turbine 1 with a high-temperature and high-pressure gas. A rotational force of the turbine 1 is transmitted to the power generator 3 through intermediation of the shaft 6 so as to rotate the power generator 3. In this way, electric power is generated and output through intermediation of an inverter 8. The gas having rotated the turbine 1 has a relatively high temperature. Thus, the gas is fed into the regenerator 5 so that heat thereof is exchanged with that of the compressed air prior to the combustion. In this way, the heat of the gas after the combustion is reused. The gas that has been subjected to the heat exchange in the regenerator 5 passes through an exhaust heat recovery device 9, and then is exhausted as an exhaust gas.

Figure 2:
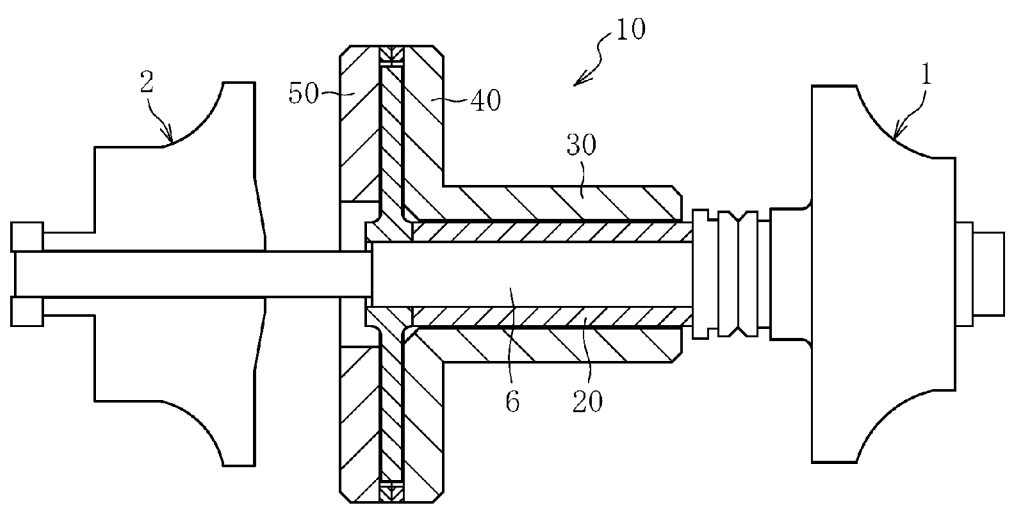
FIG. 2 is a sectional view for illustrating the support structure for a rotor of the gas turbine.

FIG. 2 is an illustration of a foil bearing unit 10 configured to support the shaft 6 of the rotor in the gas turbine. The foil bearing unit 10 comprises a rotary member 20 fixed to the shaft 6, a radial foil bearing 30 configured to support the shaft 6 and the rotary member 20 in a radial direction, and a first thrust foil bearing 40 and a second thrust foil bearing 50 configured to support the shaft 6 and the rotary member 20 in thrust directions. The foil bearing unit 10 is fixed to a housing of the gas turbine, and is configured to support, in the radial direction and the thrust directions, the shaft 6 rotatable to one side in a circumferential direction.

Figure 3:
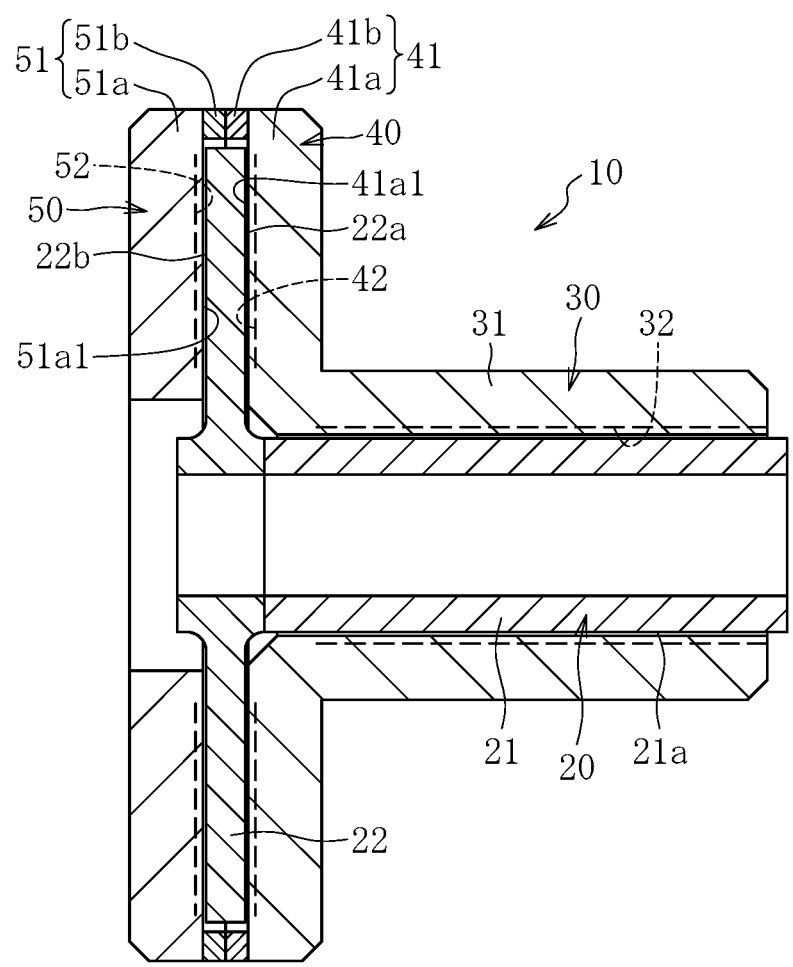
FIG. 3 is a sectional view for illustrating a foil bearing unit assembled in the support structure.

As illustrated in FIG. 3, the rotary member 20 comprises a sleeve portion 21, and a disc-like flange portion 22 projecting from the sleeve portion 21 to a radially outer side. The flange portion 22 is made, for example, of a carbon fiber reinforced composite, and the sleeve portion 21 is made, for example, of a sintered carbon material.

Figure 4:
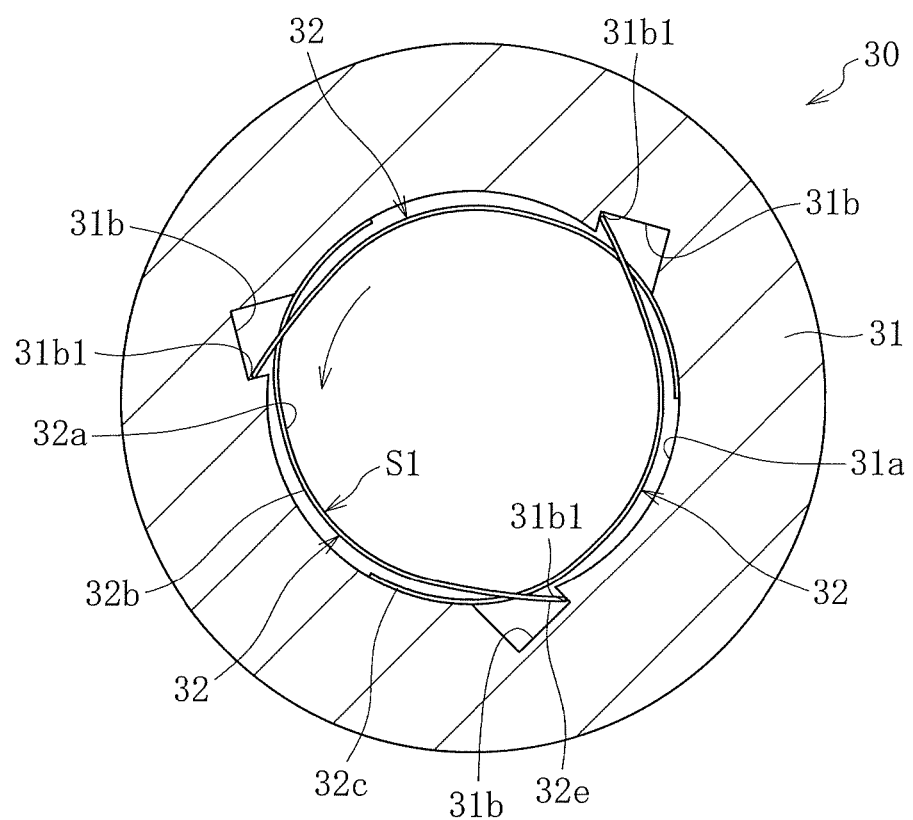
FIG. 4 is a sectional view for illustrating a radial foil bearing assembled in the foil bearing unit.

As illustrated in FIG. 4, the radial foil bearing 30 comprises a foil holder 31 having a tubular shape (cylindrical shape in the illustrated example), and a plurality of foils 32 (three foils 32 in the illustrated example) mounted to an inner peripheral surface of the foil holder 31. The plurality of foils 32 are arrayed on the inner peripheral surface of the foil holder 31 in the circumferential direction.

Grooves 31b are formed in an inner peripheral surface 31a of the foil holder 31. In this embodiment, the grooves 31b each extending in an axial direction are formed in the foil holder 31 at a plurality of equiangular positions (three equiangular positions in the illustrated example). The foil holder 31 is made of a metal, and is, for example, integrally formed including the grooves 31b through die molding. The foil holder 31 of this embodiment is integrally formed through die molding of a sintered metal. When the foil bearing unit 10 is used under a relatively low temperature environment, the foil holder 31 may be formed through die molding of a resin.

Figure 5A:
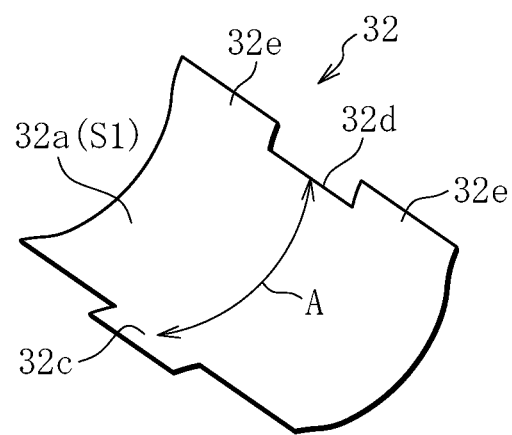
FIG. 5A is a perspective view for illustrating a foil of the radial foil bearing.
Figure 5B:
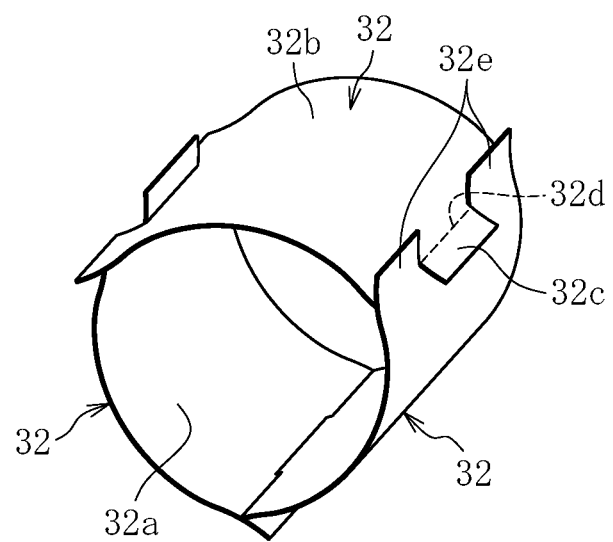
FIG. 5B is a perspective view for illustrating a state in which three foils illustrated in FIG. 5A are temporarily assembled.

As illustrated in FIG. 5A, each of the foils 32 comprises a recessed portion 32d formed at one circumferential end, and a projecting portion 32c formed at another circumferential end. The projecting portion 32c and the recessed portion 32d of each of the foils 32 are formed at the same position in the axial direction. As illustrated in FIG. 5B, the projecting portion 32c of each of the foils 32 may be fitted to the recessed portion 32d of adjacent one of the foils 32, thereby temporarily assembling the three foils 32 into a tubular shape. In this case, in the axial view illustrated in FIG. 4, the another circumferential end (projecting portion 32c) of each of the foils 32 and the one circumferential end (projecting portions 32e on both axial sides of the recessed portion 32d) of the adjacent one of the foils 32 are intersected with each other. In this state, both the circumferential ends of each of the foils 32 are held on the foil holder 31. Specifically, the projecting portions 32e at the one circumferential end of each of the foils 32 are inserted into each of the grooves 31b of the foil holder 31. The projecting portion 32c at the another circumferential end of each of the foils 32 is arranged between a radially outer surface 32b of the adjacent one of the foils 32 and the inner peripheral surface 31a of the foil holder 31. In this case, movement of the plurality of foils 32 toward the one side in the circumferential direction is restricted through abutment of the projecting portions 32e of each of the foils 32 against each of corner portions 31b1 of the grooves 31b. On the other hand, movement of the plurality of foils 32 toward the another side in the circumferential direction is not restricted. With this, the plurality of foils 32 are movable relative to the foil holder 31 in the circumferential direction.

Radially inner surfaces 32a of the foils 32 each function as a radial bearing surface S1 (see FIG. 4). In the illustrated example, three foils 32 form a multi-arc radial bearing surface S1. Members (such as back foils) configured to impart an elastic force to the foils 32 are not arranged between the inner peripheral surface 31a of the foil holder 31 and the foils 32 so that the radially outer surface 32b of each of the foils 32 and the inner peripheral surface 31a of the foil holder 31 are slidable relative to each other. The projecting portion 32c of each of the foils 32 is arranged on the radially outer side with respect to the radial bearing surface S1 of the adjacent one of the foils 32 so that the projecting portion 32c functions as an underfoil portion.

Figure 6A:
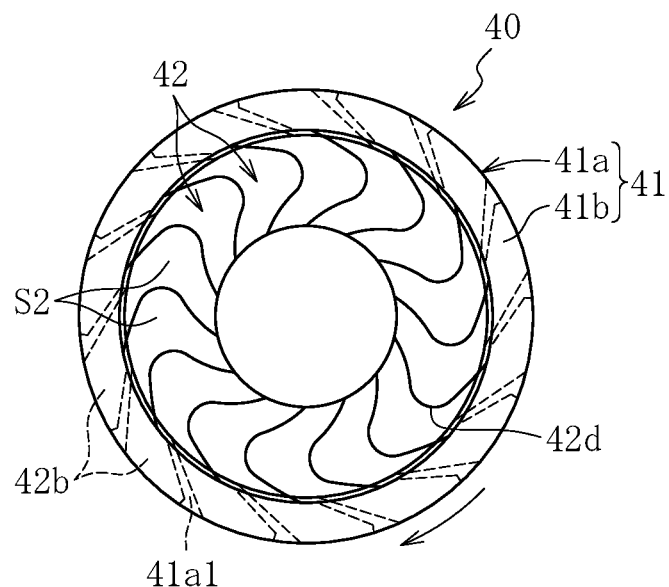
FIG. 6A is a plan view for illustrating a first thrust foil bearing according to an embodiment of a first aspect of the present invention.

The first thrust foil bearing 40 according to the embodiment of the present invention is configured to support the flange portion 22 of the rotary member 20 from one axial side, and comprises a foil holder 41 and a plurality of foils 42 mounted to the foil holder 41, as illustrated in FIG. 6A. The foil holder 41 comprises a disc-like holder body 41a having a hole formed in an axial center and a fixing member 41b arranged on a radially outer rim of an end surface 41a1 of the holder body 41a. In this embodiment, the holder body 41a of the foil holder 41 of the first thrust foil bearing 40 and the foil holder 31 of the radial foil bearing 30 are formed integrally with each other (see FIG. 3). Further, in this embodiment, the fixing member 41b is formed into an annular shape.

Figure 7:
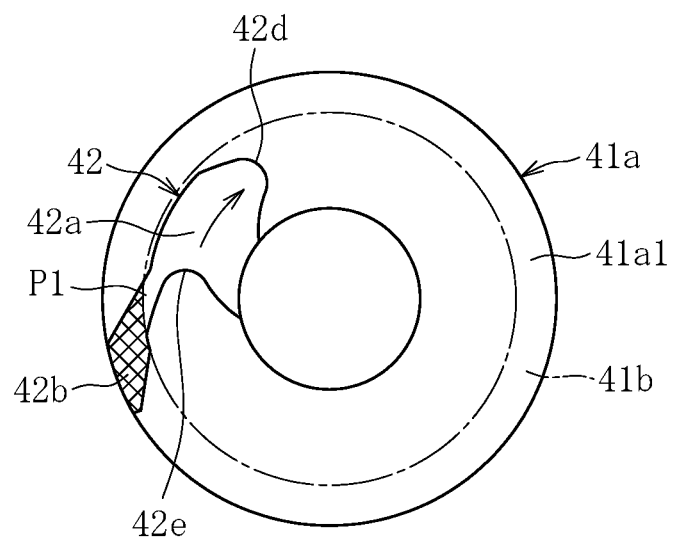
FIG. 7 is a plan view for illustrating a foil of the first thrust foil bearing.

Each of the foils 42 of the first thrust foil bearing 40 integrally comprises a body portion 42a and an extended portion 42b extending from the body portion 42a to the radially outer side, as illustrated in FIG. 7. At least a radially outer rim of an edge 42e of the body portion 42a on another circumferential side (upstream side in a rotation direction of the shaft 6) extends to a radially inner side in a direction inclined to one circumferential side (downstream side in the rotating direction of the shaft 6). In the illustrated example, the edge 42e of the body portion 42a on the another circumferential side has a central portion having an approximately V-like shape that projects to the one circumferential side (so-called herringbone pattern). Further, in the illustrated example, an edge 42d of the body portion 42a on the one circumferential side also has a central portion having an approximately V-like shape that projects to the one circumferential side. The central portion of each of the edges 42d and 42e of the body portion 42a is rounded into an arc-like shape. The extended portion 42b extends from a radially outer rim of the body portion 42a toward the radially outer side in a direction inclined to the another circumferential side. Specifically, edges of the extended portion 42b on both circumferential sides both extend to the radially outer side in the direction inclined to the another circumferential side.

The extended portion 42b of each of the foils 42 is fixed onto the same plane of the foil holder 41. In this embodiment, each of the extended portions 42b is fixed to a radially outer rim of the end surface 41a1 of the holder body 41a of the foil holder 41. Specifically, each of the extended portions 42b is arranged on the same circumference so that each of the extended portions 42b is fixed by being sandwiched between the holder body 41a of the foil holder 41 and the annular fixing member 41b. In this embodiment, a radially outer portion (indicated by the crosshatching in FIG. 7) of the extended portion 42b of each of the foils 42 is fixed to the foil holder 41.

The plurality of foils 42 are arranged at equiangular pitches (see FIG. 6A). In the illustrated example, the plurality of foils 42 are overlapped with each other in a phase shifted by an amount corresponding to half of the foils 42. The edge 42d of each of the foils 42 on the one circumferential side is arranged on adjacent one of the foils 42 (on the flange portion 22 side) (see FIG. 8). Specifically, a region including the edge 42d of each of the foils 42 on the one circumferential side overrides on a region including the edge 42e of the adjacent one of the foils 42 on the another circumferential side. In this embodiment, the extended portion 42b of each of the foils 42 is arranged on the same plane of the foil holder 41 (on the end surface 41a1 of the holder body 41a in the illustrated example). Therefore, all the foils 42 override on the adjacent foils 42 to be similarly curved. Parts of the body portions 42a of the foils 42, which directly face one end surface 22a of the flange portion 22 (parts illustrated in FIG. 6A), each function as a thrust bearing surface S2.

Figure 6B:
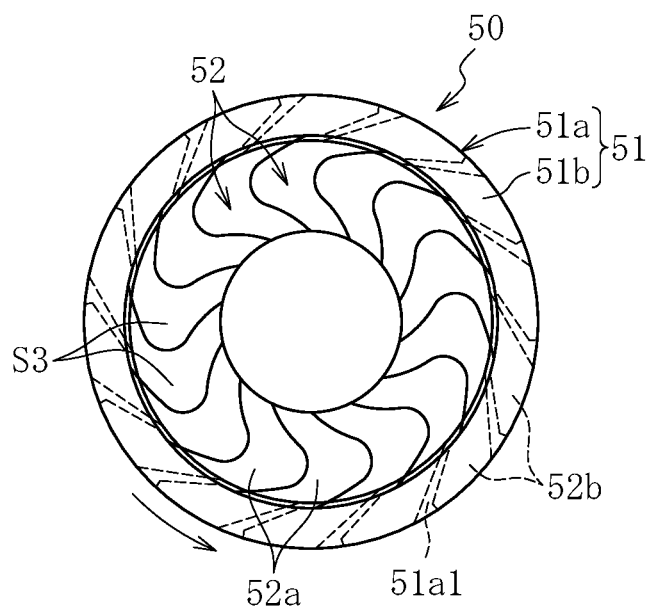
FIG. 6B is a plan view for illustrating a second thrust foil bearing according to the embodiment of the first aspect of the present invention.

A second thrust foil bearing 50 according to the embodiment of the present invention is configured to support the flange portion 22 of the rotary member 20 from another axial side, and comprises a foil holder 51 and a plurality of foils 52 fixed to the foil holder 51, as illustrated in FIG. 6B. The foil holder 51 comprises a disc-like holder body 51a having a hole formed in an axial center and a fixing member 51b arranged on a radially outer rim of an end surface 51a1 of the holder body 51a. Each of the foils 52 comprises a body portion 52a and an extended portion 52b extending from the body portion to the radially outer side. Parts of the body portions 52a of the foils 52, which directly face another end surface 22b of the flange portion 22 (parts illustrated in FIG. 6B), each function as a thrust bearing surface S3. A shape of each member of the second thrust foil bearing 50 and a fixing method thereof are the same as those of the first thrust foil bearing 40, and hence redundant description thereof is omitted.

Each of the foils 32, 42, and 52 is made of a metal that is excellent in resiliency and processability, such as a steel material or a copper alloy, and having a thickness of from approximately 20 μm to approximately 200 μm. As in this embodiment, in the air dynamic pressure bearing that uses air as a fluid film, a lubricating oil does not exist in an atmosphere. Thus, it is preferred that the metal foil be made of stainless steel or bronze.

The foil bearing unit 10 having the configuration described above is assembled by the procedure as described below. First, the sleeve portion 21 of the rotary member 20 is inserted along an inner periphery of the radial foil bearing 30. After that, the second thrust foil bearing 50 is mounted to the first thrust foil bearing so that the flange portion 22 of the rotary member 20 is sandwiched from both the axial sides. Specifically, the fixing member 41b of the foil holder 41 of the first thrust foil bearing 40 and the fixing member 51b of the foil holder 51 of the second foil bearing 50 are brought into abutment against each other, and in this state, both the foil holders 41 and 51 are fixed with bolts or other fasteners (not shown) in the axial direction. In this way, the foil bearing unit 10 is completed.

The shaft 6 is press-fitted to an inner periphery of the rotary member 20 of the assembled foil bearing unit 10, and a part or an entirety of each of the foil holders 31, 41, and 51 of the foil bearings 30, 40, and 50 is fixed to the housing of the gas turbine. At this time, the radial foil bearing 30 and the thrust foil bearings 40 and 50, and the rotary member 20 are integrated as the foil bearing unit 10, and therefore, can be easily assembled into the gas turbine.

When the shaft 6 is rotated to one side in the circumferential direction (direction of the arrow in each of FIG. 4 and FIG. 7), a radial bearing gap is formed between the radial bearing surface S1 of each of the foils 32 of the radial foil bearing 30 and an outer peripheral surface 21a of the sleeve portion 21 of the rotary member 20, and a pressure of an air film formed in the radial bearing gap allows the rotary member 20 and the shaft 6 to be supported in the radial direction. At the same time, thrust bearing gaps are formed respectively between the thrust bearing surface S2 of the foils 42 of the first thrust foil bearing 40 and the one end surface 22a of the flange portion 22 of the rotary member 20, and between the thrust bearing surface S3 of the foils 52 of the second thrust foil bearing 50 and the another end surface 22b of the flange portion 22 of the rotary member 20. Pressures of air films formed in the thrust bearing gaps allow the rotary member 20 and the shaft 6 to be supported in both the thrust directions.

At this time, due to flexibilities of the foils 32, 42, and 52, the bearing surfaces S1, S2, and S3 of the foils 32, 42, and 52 are randomly deformed in accordance with operating conditions such as a load, a rotation speed of the shaft 6, and an ambient temperature. Thus, the radial bearing gap and the thrust bearing gaps are automatically adjusted so as to have appropriate widths in accordance with the operating conditions. As a result, even under severe conditions involving high temperature and high speed rotation, the radial bearing gap and the thrust bearing gaps may be managed so as to have optimum widths, and hence the rotary member 20 and the shaft 6 may be stably supported.

Figure 8:
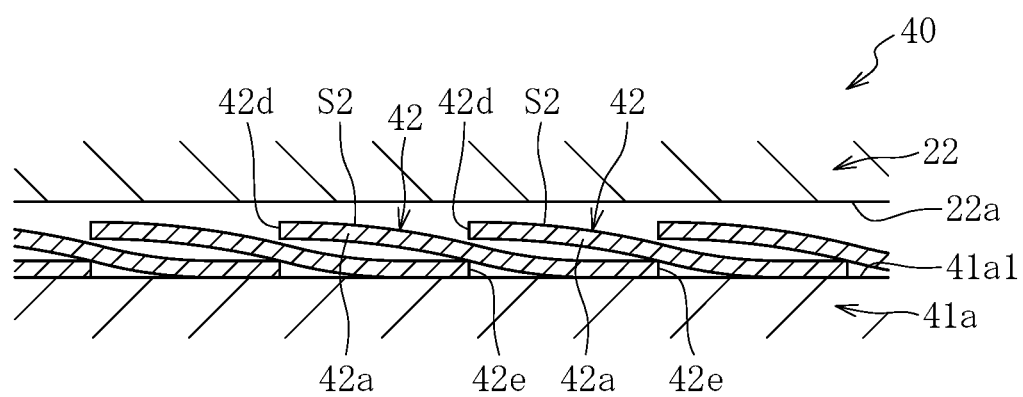
FIG. 8 is a sectional view for illustrating the first thrust foil bearing.

Each of the foils 42 overrides on the adjacent one of the foils 42 to impart elasticity in the first thrust foil bearing 40 (the same applies to the second thrust foil bearing 50, which is omitted below), as illustrated in FIG. 8. Therefore, a back foil can be omitted so as to reduce the number of components, thereby reducing cost. Further, in each of the foils 42, the extended portion 42b that is provided on the radially outer side with respect to the bearing surface S2 is fixed to the foil holder 41. As a result, a fixing portion between the foil 42 and the foil holder 41 is not provided below the bearing surface S2. Thus, concavity and convexity due to the fixing portion are not formed on the bearing surface S2. Therefore, the entire region of the bearing surface S2 can be caused to work effectively, thereby enhancing supportability.

In the first foil bearing 40, the extended portion 42b of each of the foils 42 is arranged on the same plane (on the end surface 41a1 of the holder body 41a). As a result, all the foils 42 override on the adjacent foils 42 to be similarly curved. Specifically, the entire radial regions of the body portions 42a of all the foils 42 override on the adjacent foils 42 from the end surface 41a1 of the holder body 41a to be curved. At this time, it is preferred that the edge 42e of the body portion 42a of each of the foils 42 on the another circumferential side be held in contact with the end surface 41a1 of the holder body 41a over the entire radial region. As a result, a thrust bearing gap that is gradually decreased to the one circumferential side (left side in FIG. 8) is formed between the thrust bearing surfaces S2 of all the foils 42 and the end surface 22a of the flange portion 22 of the rotary member 20. Further, each of the foils 42 is curved to apply an appropriate elastic force to each of the foils 42. Balance between the elastic force and a pressure of a fluid in the thrust bearing gap allows a gap width of the thrust bearing gap to be constantly kept appropriately. As a result, excellent supportability can be obtained.

The radially outer rim of the edge 42e of the body portion 42a of each of the foils 42 on the another circumferential side extends to the radially inner side in the direction inclined to the one circumferential side. As a result, when the body portion 42a of the adjacent one of the foils 42 overrides on the edge 42e, a step that is inclined to the one circumferential side toward the radially inner side is formed on the radially outer rim of the bearing surface S2 of the body portion 42a. The fluid (air) around the bearing surface S2 can be caused to actively flow along the step into the thrust bearing gap. Thus, the pressure of the fluid in the thrust bearing gap can be increased. In particular, in this embodiment, the edge 42e of the body portion 42a of each of the foils 42 on the another circumferential side is formed to have the herringbone pattern. As a result, the fluid can be collected in the radial center of the bearing surface S2 so as to further increase the pressure of the fluid in the thrust bearing gap.

Along with flow of the fluid, which is caused by the rotation of the shaft 6, each of the foils 42 of the thrust foil bearing 40 is pulled to the one circumferential side. At this time, a radially inner portion P1 of the extended portion 42b of each of the foils 42 (see FIG. 7) extends to the radially outer side in the direction inclined to the another circumferential side. As a result, a direction of a force mainly applied to the radially inner portion P1 can be set not to a shearing direction but to a tensile direction. Thus, damage to each of the foils 42 can be prevented to increase durability of the foils 42.

During the low speed rotation immediately before the stop or immediately after the actuation of the shaft 6, the bearing surfaces of the foils (in particular, a bearing surface of each of the foils 32 of the radial foil bearing 30) and the rotary member 20 come into sliding contact with each other. Thus, low-friction coating such as a DLC film, a titanium aluminum nitride film, a tungsten disulfide film, and a molybdenum disulfide film may be formed on one or both of the bearing surface of each of the foils and the rotary member 20. Further, during the rotation of the shaft 6, due to the slight sliding between each of the foils 32, 42, and 52 and each of the foil holders 31, 41, and 51, the vibration of the shaft 6 can be suppressed. In order to adjust a frictional force that is generated by the slight sliding, the low-friction coating as described above may be formed on one or both of each of the foils 32, 42, and 52 and each of the foil holders 31, 41, and 51.

Now, an example of a method of manufacturing the first thrust foil bearing 40 is described. A method of manufacturing the second thrust foil bearing 50 is the same as that of the first thrust foil bearing 40, and therefore redundant description thereof is omitted. Further, the foil holder 31 of the radial foil bearing 30 is provided integrally with the holder body 41a of the foil holder 41 of the first thrust foil bearing 40. In the following description, however, the foil holder 31 is omitted.

Figure 9A:
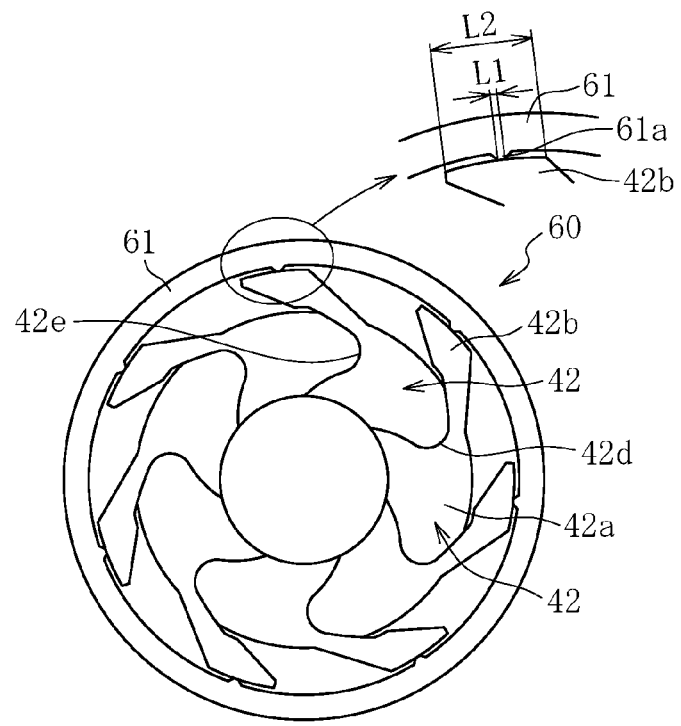
FIG. 9A is a plan view for illustrating a foil member formed by coupling a plurality of foils.
Figure 9B:
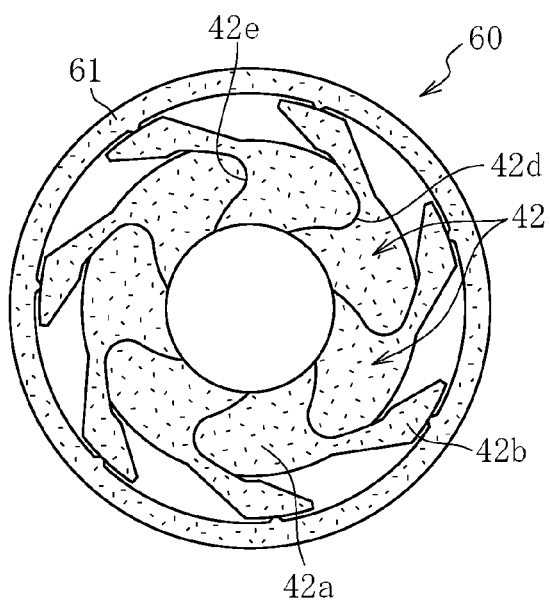
FIG. 9B is a plan view for illustrating a foil member formed by coupling the plurality of foils.

First, as illustrated in FIG. 9A and FIG. 9B, two foil members 60 are formed. The two foil members 60 have the same shape, and one of the foil members 60 is illustrated with dots for easy understanding in FIG. 9 to FIG. 12. Each of the foil members 60 is formed integrally through press working on a single foil. Each of the foil members 60 comprises the plurality of foils 42 and a coupling portion 61 configured to couple radially outer rims thereof. In the illustrated example, the coupling portion 61 is formed into an annular shape. Each of the foil members 60 comprises half the number of foils 42 to be assembled into the first thrust foil bearing 40, which are provided equiangularly. A circumferential dimension L1 of a boundary between the extended portion 42*b* of each of the foils 42 and the coupling portion 61 (cut plane formed by subsequent cutting) is smaller than a circumferential dimension L2 of the radially outer rim of the extended portion 42*b* of each of the foils 42. In this embodiment, a plurality of projections 61*a* that project to the radially inner side are formed on the coupling portion 61. The circumferential dimension L1 of the boundary between each of the projections 61*a* and each of the foils 42 is set smaller than the circumferential dimension L2 of the radially outer rim of the extended portion 42*b*. For example, L1 is set equal to or smaller than ⅕ of L2.

Figure 10:
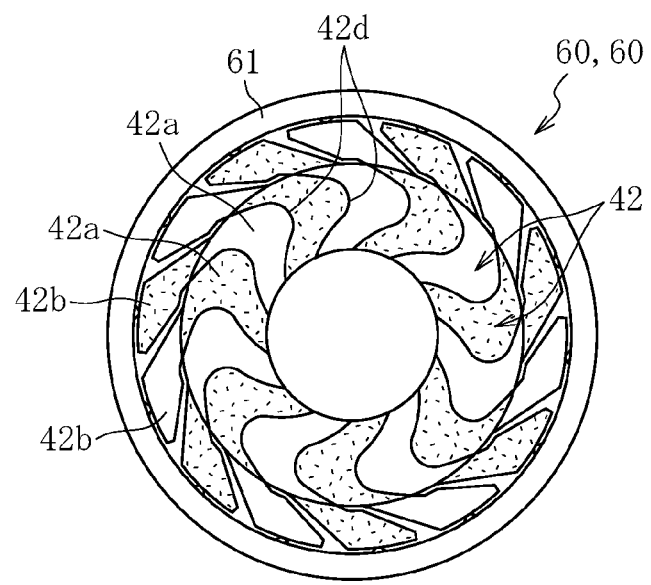
FIG. 10 is a plan view for illustrating a state in which the foil members illustrated in FIG. 9A and FIG. 9B are temporarily assembled.

Next, as illustrated in FIG. 10, the two foil members 60 are temporarily assembled. Specifically, the two foil members 60 are first overlapped with each other. Then, the edge 42*d* of the body portion 42*a* of each of the foils 42 on the one circumferential side is arranged so as to be overlapped on a region (on a near side in FIG. 10) including the edge 42*e* of the body portion 42*a* of the adjacent one of the foils 42 on the another circumferential side while the foils 42 of the overlying foil member 60 and the foils 42 of the underlying foil member 60 are shifted from each other by a half pitch.

Figure 11:
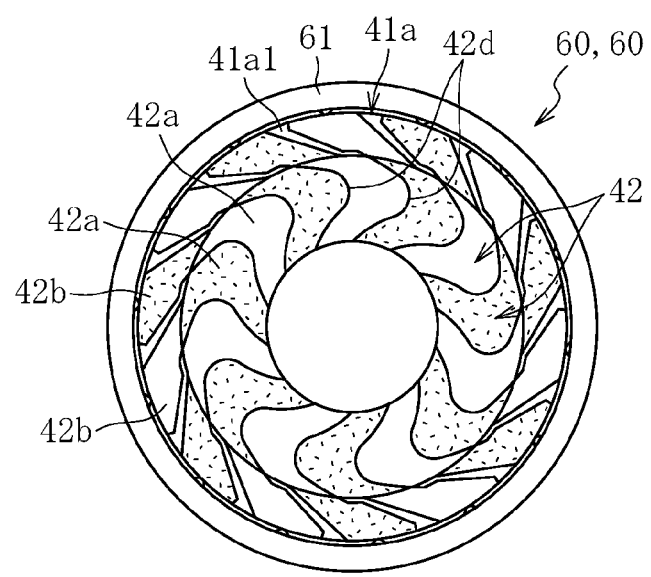
FIG. 11 is a plan view for illustrating a state in which two temporarily assembled foil members are arranged on a holder body of a foil holder.
Figure 12:
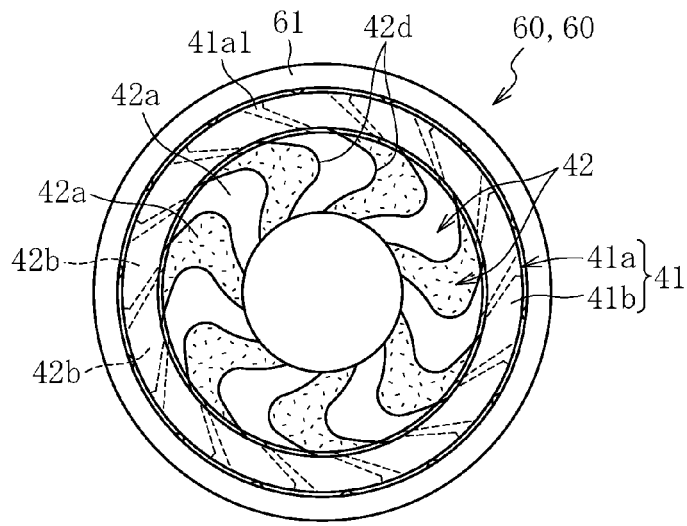
FIG. 12 is a plan view for illustrating a state in which a fixing member is mounted to the holder body illustrated in FIG. 11.

Thereafter, as illustrated in FIG. 11, the two temporarily assembled foil members 60 are arranged on the end surface 41*a*1 of the holder body 41*a*. At this time, the radially outer rim of the extended portion 42*b* of each of the foils 42 is arranged along the radially outer rim of the end surface 41*a*1 of the holder body 41*a*. The coupling portion 61 of the foil member 60 is arranged on a radially outer side with respect to the holder body 41*a*. Each of the foils 42 is fixed to the foil holder 41 in this state, as illustrated in FIG. 12. In this embodiment, the annular fixing member 41*b* is fixed to the holder body 41*a* with bolts or other fasteners (not shown). As a result, the radially outer portion of the extended portion 42*b* of each of the foils 42 is sandwiched between the holder body 41*a* and the fixing member 41*b* to fix each of the foils 42 to the foil holder 41. In this manner, the extended portions 42*b* of all the foils 42 are fixed onto the same plane of the foil holder 41 (onto the end surface 41*a*1 of the holder body 41*a*).

Thereafter, the coupling portion 61 of each of the foil members 60 is separated from the foils 42. In this embodiment, the boundaries between the projections 61*a* of the coupling portion 61 and the foils 42 are cut to separate and remove the coupling portion 61 from the foils 42. In this manner, the first thrust foil bearing 40 illustrated in FIG. 6A is completed.

The present invention is not limited to the embodiment described above. Now, description is made of other embodiments of the present invention. Parts having the same functions as those in the embodiment described above are denoted by the same reference symbols, and redundant description thereof is omitted.

Figure 13:
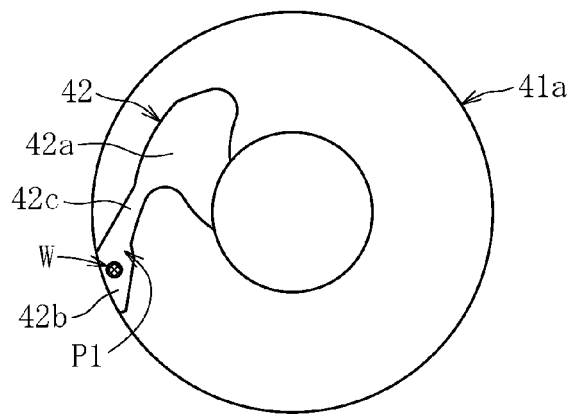
FIG. 13 is a plan view for illustrating a foil according to another embodiment of the present invention.

The extended portions 42*b* of the respective foils 42 are fixed by being sandwiched between the holder body 41*a* of the thrust foil bearing 40 and the fixing member 41*b* in the embodiment described above, the fixation therebetween is not limited thereto. Each of the foils 42 may be fixed to the holder body 41*a* or the fixing member 41*b* through welding or bonding, or by other methods. In an embodiment of the present invention, which is illustrated in FIG. 13, the extended portion 42*b* of each of the foils 42 is fixed to the holder body 41*a* through welding (for example, spot welding). In this case, a region of the extended portion 42*b*, which is adjacent to a radially inner side of a welding point W (radially inner portion P1 of the extended portion 42*b*), extends to the radially outer side in a direction inclined to the another circumferential side. Even in this case, a direction of a force that is applied to the radially inner portion P1 of the extended portion 42*b* along with the rotation of the shaft 6 can be mainly set to the tensile direction, as in the embodiment described above. The fixation of the foils 42 by being sandwiched between the holder body 41*a* and the fixing member 41*b* and the fixation of the foils 42 to the foil holder 41 through welding or bonding may both be used. In this case, when a fixing force between the foils 42 and the foil holder 41 through welding or bonding is sufficient, the fixing member 41*b* may be omitted or the fixing member 41*b* may be caused to function as a mere spacer. Further, although the extended portion 42*b* of each of the foils 42 is fixed to the holder body 41*a* at the single welding point W in FIG. 13, the fixation is not limited thereto. Each of the extended portions 42*b* may be fixed to the holder body 41*a* at two or more welding points W.

Figure 14:
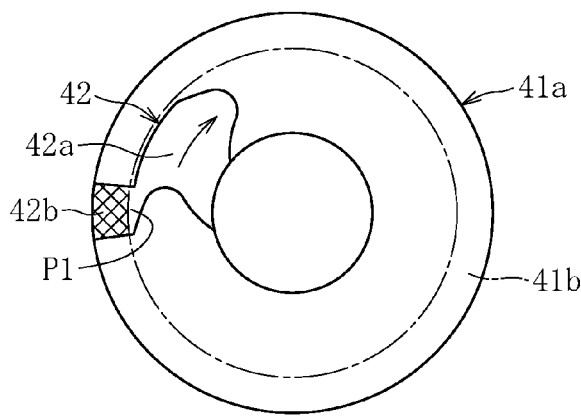
FIG. 14 is a plan view for illustrating a foil according to still another embodiment of the present invention.

In an embodiment of the present invention, which is illustrated in FIG. 14, the extended portion 42*b* of the foil 42 extends from a radially outer rim of the body portion 42*a* to the radially outer side. A radially outer portion of the extended portion 42*b* is fixed by being sandwiched between the fixing member 41*b* and the holder body 41*a*. Even in this case, the extended portions 42*b* are fixed onto the same plane of the foil holder 41. Therefore, similarly to the embodiments described above, all the foils 42 can be caused to override on the adjacent foils 42 so as to be curved. However, the radially inner portion P1 of the extended portion 42*b* extends in the radial direction. Therefore, when the body portion 42*a* of the foil 42 is pulled to the one circumferential side by the flow of air, which is caused along with the rotation of the shaft 6, a force in the shear direction is mainly exerted on the radially inner portion P1 of the extended portion 42*b*. Therefore, there is a fear in that the foils 42 are damaged. Thus, in view of the durability of the foils 42, the embodiment illustrated in FIG. 7 or the embodiment illustrated in FIG. 13 is more preferred.

The first thrust foil bearing 40 is assembled by using the foil member 60 obtained by coupling the plurality of foils 42 of the thrust foil bearing 40 by the coupling portion 61 in the embodiments described above, but the assembly of the first thrust foil bearing 40 is not limited thereto. For example, the plurality of foils 42 may be mounted to the foil holder 41 one by one through welding or bonding without being coupled by the coupling portion 61.

Figure 15:
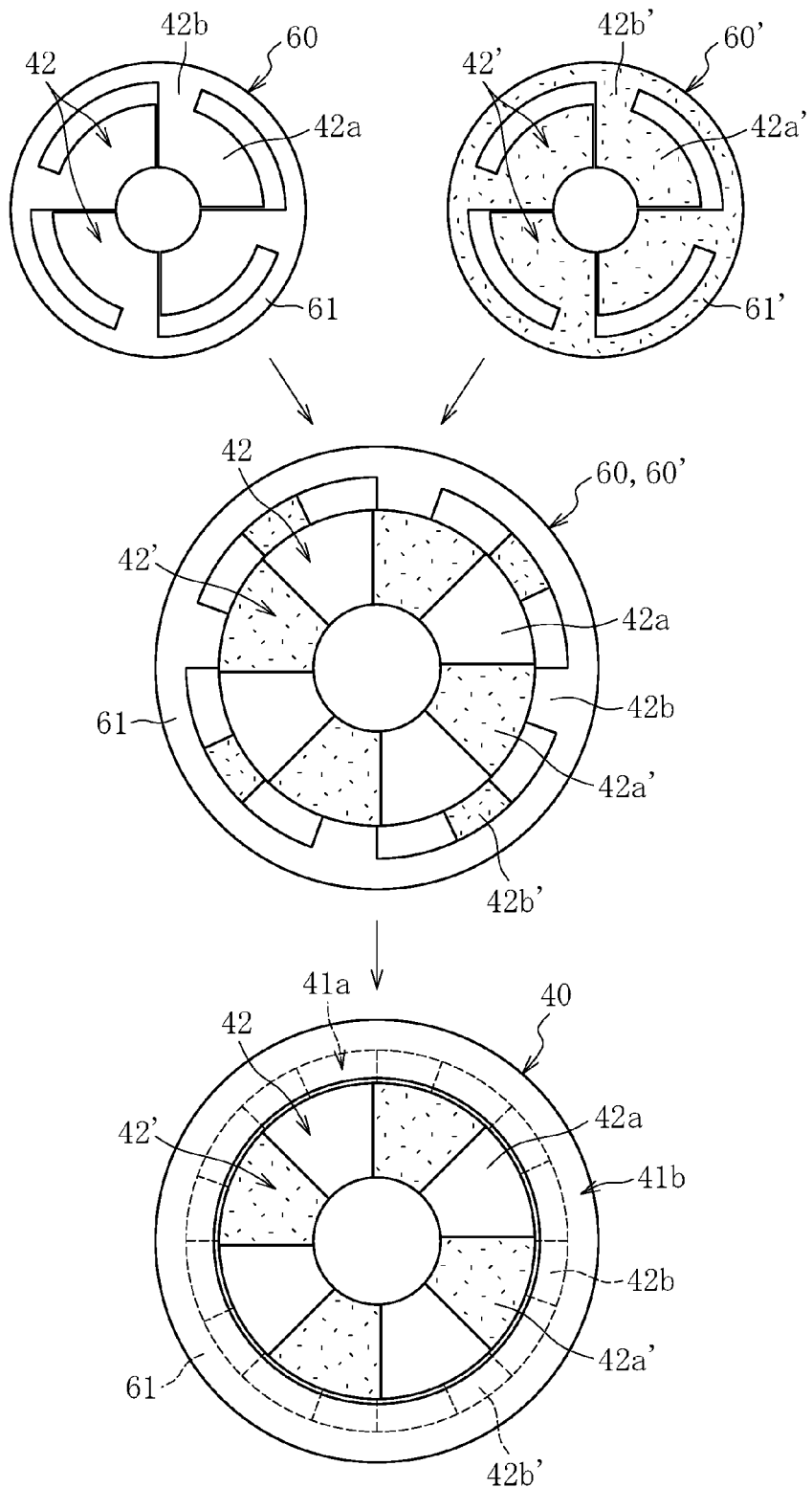
FIG. 15 is a view in which an upper part is a plan view for illustrating two foil members to be used for a thrust foil bearing according to yet another embodiment of the present invention, a middle part is a plan view for illustrating the two temporarily assembled foil members, and a lower part is a plan view for illustrating the thrust foil bearing.
Figure 16:
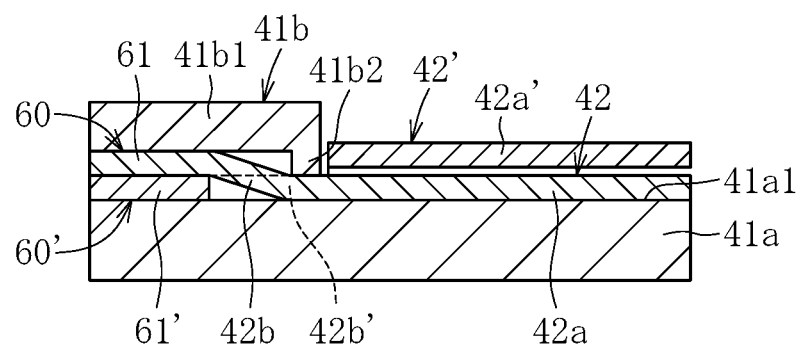
FIG. 16 is a sectional view for illustrating the thrust foil bearing illustrated in the lower part of FIG. 15.

In the thrust foil bearing 40 illustrated in FIG. 15, a plurality of foil members 60 and 60' are fixed together with the coupling portion 61 and a coupling portion 61' to the foil holder 41. Although the two foil members 60 and 60' have the same shape, one foil member 60' is illustrated with dots and the reference symbols for portions of the one foil member 60' are followed by "'" in FIG. 15 for easy understanding. The thrust foil bearing 40 is assembled by the following procedure. First, the two foil members 60 and 60', which are respectively obtained by coupling the radially outer rims of the plurality of foils 42 by the coupling portion 61 and the radially outer rims of the plurality of foils 42' by the coupling portion 61', are formed (see an upper part of FIG. 15). Next, the two foil members 60 are overlapped to be temporarily assembled while an end portion of each of the foils 42 and 42' on the one circumferential side is overlapped on adjacent one of the foils 42' and 42 (see a middle part of FIG. 15). Then, the two temporarily assembled foil members 60 and 60' are placed on the holder body 41a, and is fixed to the foil holder 41 by using the fixing member 41b (see a lower part of FIG. 15). The fixing member 41b comprises an annular portion 41b1 and a holding portion 41b2 projecting downward from the annular portion 41b1, as illustrated in FIG. 16. The holding portion 41b2 is provided, for example, over the entire periphery of the annular portion 41b1. The two overlapped coupling portions 61 and 61' are fixed by being sandwiched between the annular portion 41b1 of the fixing member 41b and the holder body 41a. At the same time, the extended portion 42b of each of the foils 42 and the extended portion 42b' of each of the foils 42b' are fixed by being sandwiched between the holding portion 41b2 of the fixing member 41b and the holder body 41a. In this manner, the extended portions 42 and 42' of all the foils 42 and 42' are fixed onto the same plane of the foil holder 41 (onto the end surface 41a1 of the holder body 41a).

The radial foil bearing 30 is formed as a multi-arc bearing in the embodiments described above, but the radial foil bearing 30 is not limited thereto. There may also be used a so-called leaf-type radial bearing foil in which the one circumferential end of each of the foils is mounted to the inner peripheral surface 31a of the foil holder 31 and the another circumferential end of each of the foils is formed as a free end, or a so-called bump foil-type radial bearing foil in which a corrugated back foil is arranged on an outer diameter side of a cylindrical top foil.

Further, the shape of the foil may be changed as long as the present invention is not essentially affected thereby. For example, the foils of the thrust foil bearing may be formed into a spiral pattern, or the foils of the radial foil bearing may be formed into a herringbone pattern.

Further, the radial foil bearing 30 and the thrust foil bearings 40 and 50 are integrated as the foil bearing unit 10, and the foil bearing unit 10 is then mounted to the gas turbine in the embodiment described above. However, the mounting of the foil bearings is not limited thereto. The foil bearings 30, 40, and 50 may be separately mounted to the gas turbine.

The coupling portion 61 of the foil member 60 is formed into the annular shape in the embodiment described above, but the shape of the coupling portion 61 is not limited thereto. For example, a C-shaped coupling portion having a space at one position in the circumferential direction may be used. Alternatively, an annular coupling portion may be divided at a plurality of positions in the circumferential direction so that the plurality of foils are provided respectively to the divided coupling portions.

Figure 17:
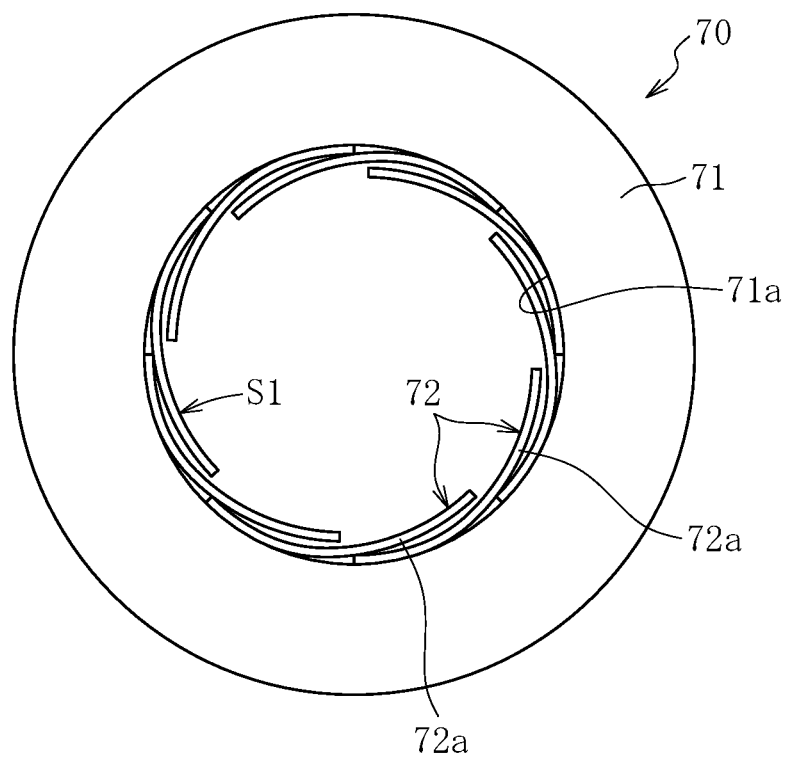
FIG. 17 is a front view for illustrating a radial foil bearing according to an embodiment of the first aspect of the present invention.

In FIG. 17, a radial foil bearing 70 according to an embodiment of the present invention is illustrated. The radial foil bearing 70 comprises a tubular foil holder 71 (cylindrical foil holder 71 in the illustrated example) and a plurality of foils 72 (eight foils 72 in the illustrated example) mounted to an inner peripheral surface of the foil holder 71. The plurality of foils 72 are arrayed on the inner peripheral surface of the foil holder 71 in the circumferential direction.

An inner peripheral surface 71a of the foil holder 71 is formed as a cylindrical surface. The foil holder 71 is made of a metal, and is, for example, integrally formed through die molding of a sintered metal.

Figure 18:
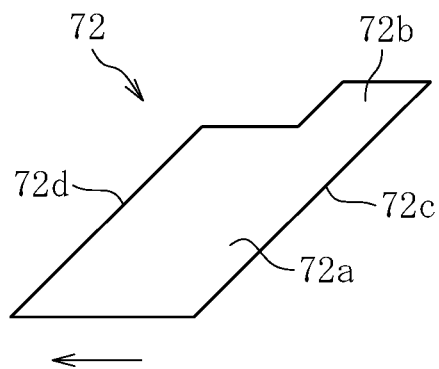
FIG. 18 is a plan view for illustrating a foil of the radial foil bearing illustrated in FIG. 17.

Each of the foils 72 comprises a body portion 72a having a bearing surface and an extended portion 72b extending from the body portion 72a to one axial side (upper side in FIG. 18), as illustrated in FIG. 18. An edge 72c of the body portion 72a on another circumferential side (side opposite to the arrow in FIG. 18) extends in a direction inclined to the one circumferential side toward another axial side (to a lower side in FIG. 18). An edge 72d of the body portion 72a on the one circumferential side is parallel to the edge 72c on the another circumferential side.

Figure 19:
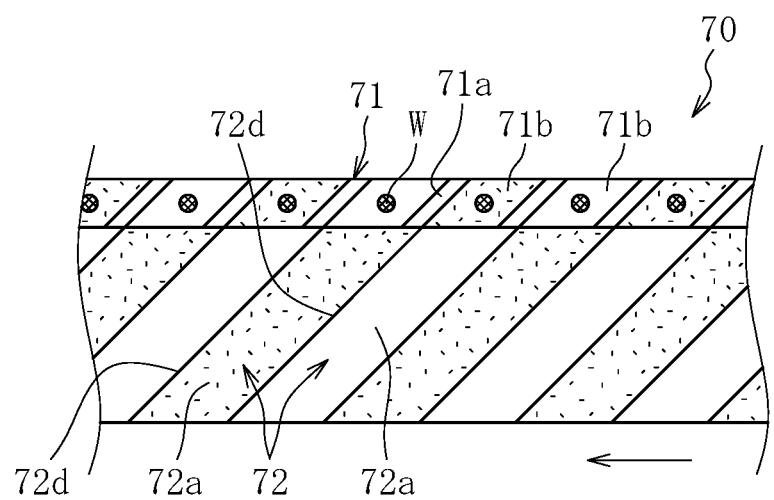
FIG. 19 is a developed plan view for illustrating the radial foil bearing illustrated in FIG. 17.

The extended portion 72b extends from the body portion 72a to the axial one side in a direction inclined to the another circumferential side. As illustrated in FIG. 19, the end portion (edge 72d) of the body portion 72a of each of the foils 72 on the one circumferential side is arranged so as to be overlapped on (radially inner side of) the body portion 72a of the adjacent one of the foils 72. The extended portion 72b of each of the foils 72 is fixed onto the same cylindrical surface of the inner peripheral surface 71a of the foil holder 71. In this embodiment, the extended portion 72b is fixed to the inner peripheral surface 71a of the foil holder 71 through welding.

Radially inner surfaces of the foils 72 each function as the radial bearing surface S1 (see FIG. 17). Members (such as back foils) configured to impart an elastic force to the foils 72 are not arranged between the inner peripheral surface 71a of the foil holder 71 and the foils 72 so that a radially outer surface of each of the foils 72 and the inner peripheral surface 71a of the foil holder 71 are slidable relative to each other. A region including the end portion of the body portion 72a of each of the foils 72 on the another circumferential side is arranged on the radially outer side with respect to the radial bearing surface S1 of the adjacent one of the foils 72 so that the region functions as an underfoil portion.

Figure 20A:
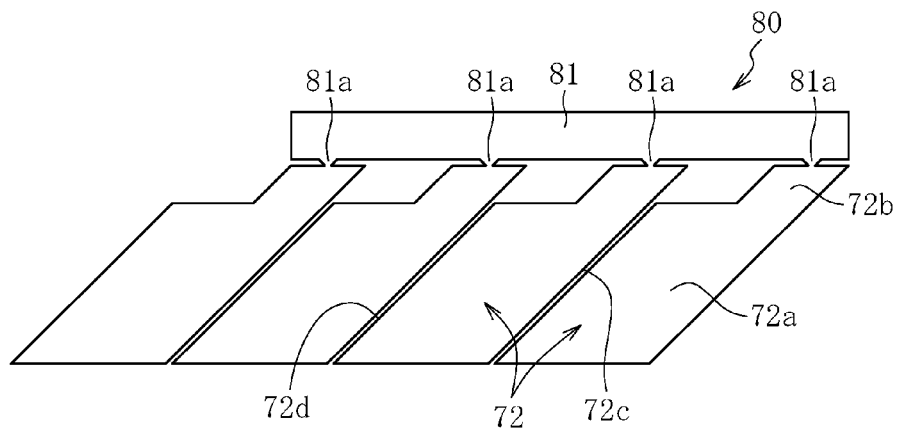
FIG. 20A is a plan view for illustrating a foil member formed by coupling the plurality of foils.
Figure 20B:
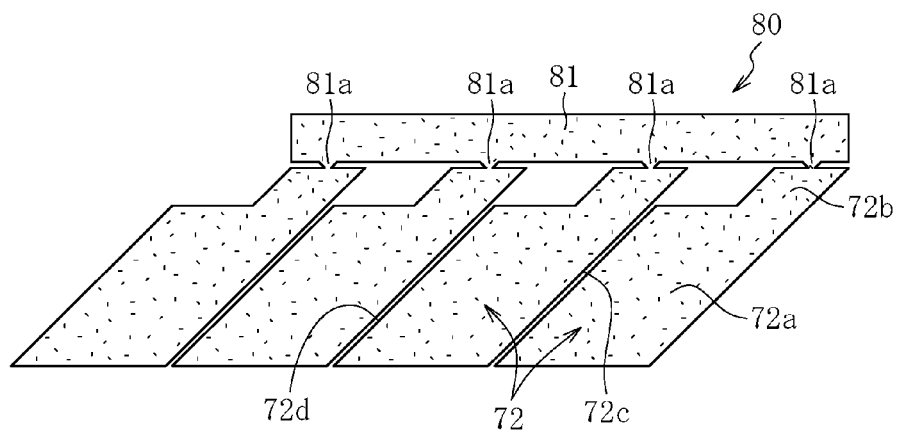
FIG. 20B is a plan view for illustrating a foil member formed by coupling the plurality of foils.

Now, an example of a method of manufacturing the radial foil bearing 70 is described. First, as illustrated in FIG. 20A and FIG. 20B, two foil members 80 are formed. The two foil members 80 have the same shape, and one of the foil members 80 is illustrated with dots for easy understanding in FIG. 20 and FIG. 21. Each of the foil members 80 is formed integrally through press working on a single foil. Each of the foil members 80 comprises the plurality of foils 72 and a belt-like coupling portion 81 configured to couple axial end portions of the plurality of foils 72. Each of the foil members 80 comprises half the number of foils 72 (that is, four foils) to be assembled into the radial foil bearing 70, which are provided equiangularly. A circumferential dimension of a boundary between the extended portion 72b of each of the foils 72 and the coupling portion 81 (cut plane formed by subsequent cutting) is smaller than a circumferential dimension of one axial end portion of the extended portion 72b of each of the foils 72 (upper end in FIG. 20). In this embodiment, a plurality of projections 81a are formed on the coupling portion 81 to couple each of the projections 81a and each of the foils 72.

Figure 21:
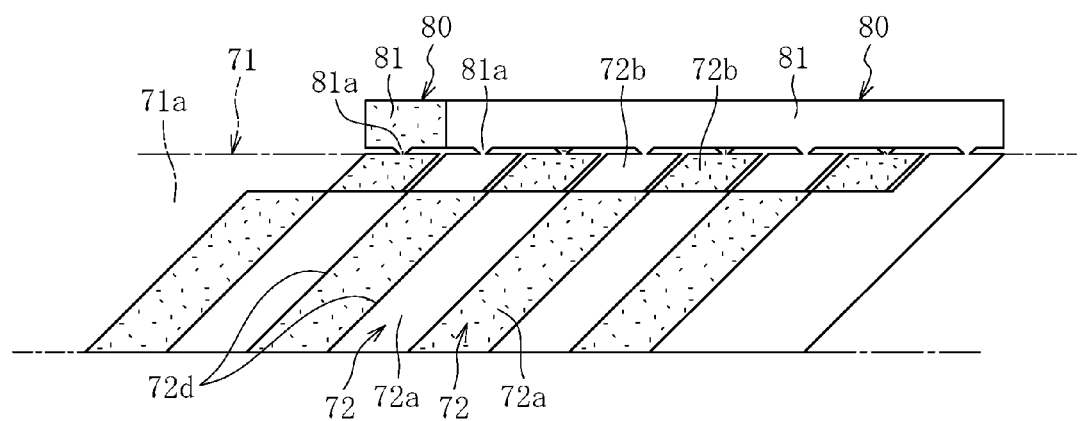
FIG. 21 is a plan view for illustrating a state in which the foil members illustrated in FIG. 20A and FIG. 20B are temporarily assembled.
Figure 22:
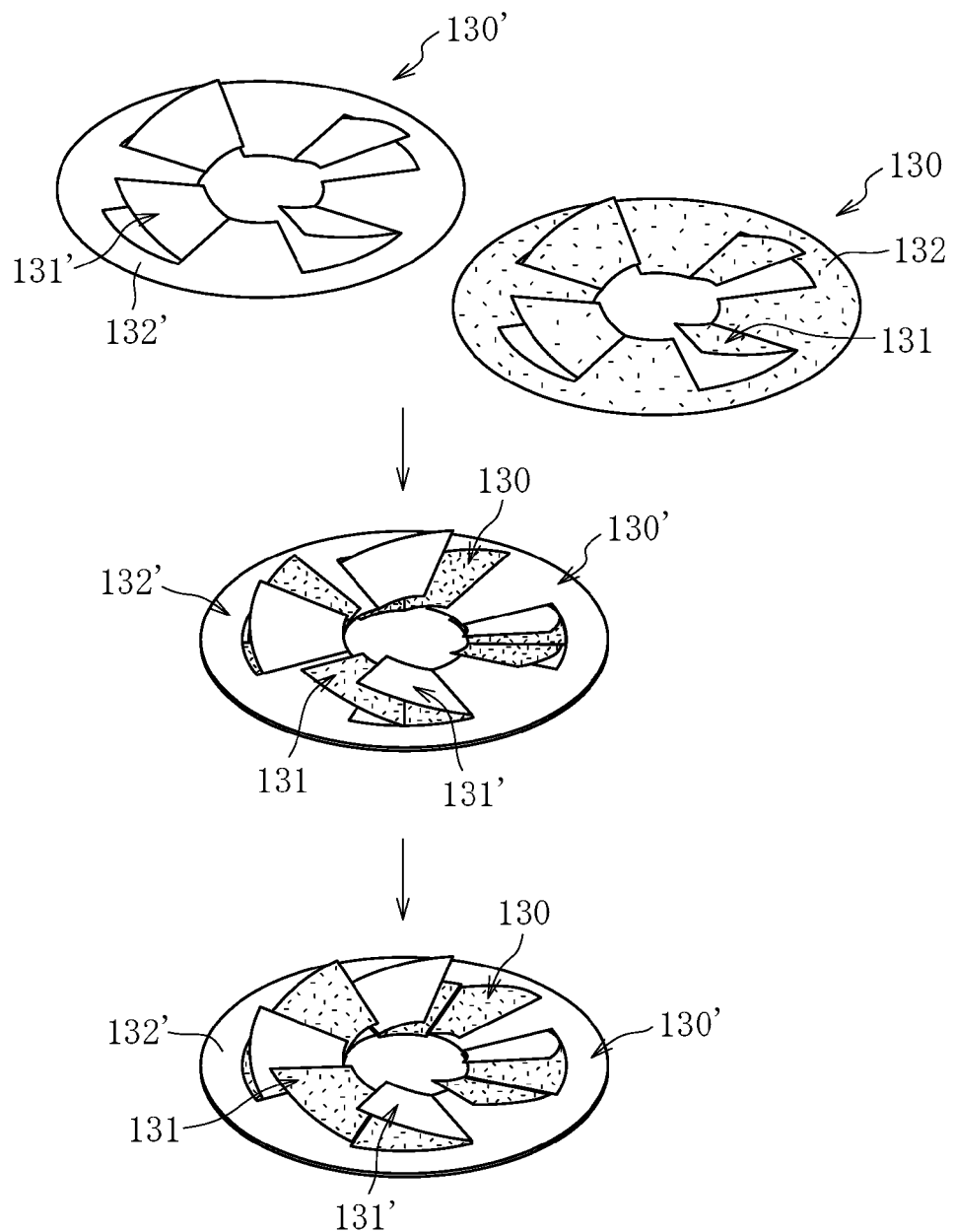
FIG. 22 is a view in which an upper part is a perspective view for illustrating two foil members to be used for a related-art thrust foil bearing, a middle part is a perspective view for illustrating a state in which the two foil members are being temporarily assembled, and a lower part is a perspective view for illustrating a state in which the two foil members are temporarily assembled.
Figure 23:
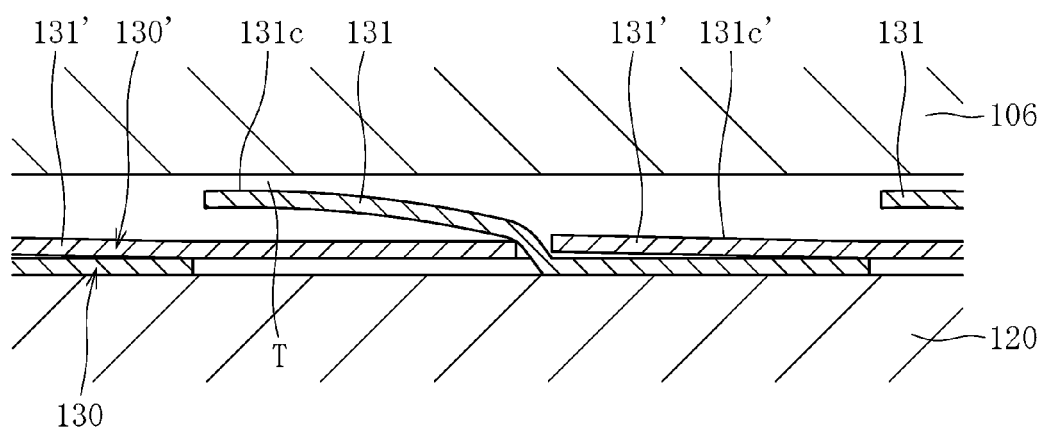
FIG. 23 is a sectional view for illustrating the thrust foil bearing comprising the foils illustrated in FIG. 22.

Next, as illustrated in FIG. 21, the two foil members 80 are temporarily assembled. Specifically, the two foil members 80 are overlapped with each other. Then, the end portion 72d of the body portion 72a of each of the foils 72 on the one circumferential side is arranged so as to be overlapped on the body portion 72a of the adjacent one of the foils 72 (on a near side in FIG. 21) while the foils 72 of the overlying foil member 80 (without dots) and the foils 72 of the underlying foil member 80 (with dots) are shifted from each other by a half pitch. Thereafter, the two temporarily assembled foil members 80 are arranged on the inner peripheral surface 71a of the foil holder 71 (indicated by the chain line in FIG. 21) while being rounded. At this time, the axial end portion of the extended portion 72b of each of the foils 72 is arranged along an axial end of the inner peripheral surface 71a of the foil holder 71. The coupling portion 81 of the foil member 80 is arranged on an axially outer side with respect to the foil holder 71. In this state, the extended portion 72b of each of the foils 72 is fixed to the foil holder 71 through welding, as illustrated in FIG. 19. In this manner, the extended portions 72b of all the foils 72 are fixed onto the same cylindrical surface (onto the inner peripheral surface 71a) of the foil holder 71.

Thereafter, the coupling portion 81 of each of the foil members 80 is separated from the foils 72. In this embodiment, the boundaries between the projections 81a of the coupling portion 81 and the foils 72 are cut to separate and remove the coupling portion 81 from the foils 72. In this manner, the radial foil bearing 70 illustrated in FIG. 17 is completed.

The coupling portions 61 and 81 are removed after the assembly of the foil bearing in the embodiments described above, but the foil bearing can be attained even without removing the coupling portions 61 and 81. However, the coupling portions have no function after the assembly. Therefore, by removing the coupling portions as in the embodiment described above, dimensions of the foil bearing can be reduced, thereby being capable of downsizing and lightening the entire turbo machine.

The thrust foil bearing and the radial foil bearing according to the present invention are applicable not only to the gas turbine described above, but may also be used as a bearing configured to support a rotor of a supercharger, for example. Further, the foil bearing according to the present invention may be used not only as turbo machines such as the gas turbine and the supercharger, but widely used also as bearings for vehicles such as automobiles, which are used under restrictions such as a difficulty in lubricating with a liquid such as a lubricating oil, a difficulty in separately arranging an auxiliary device of a lubricating oil circulatory system in view of energy efficiency, or problems that may be caused by shearing resistance of the liquid. The foil bearing according to the present invention may be widely used also as bearings for industrial devices.

Further, the foil bearings described above are each an air dynamic pressure bearing that uses air as a pressure generating fluid. However, the present invention is not limited thereto, and other gases or liquids such as water and oil may be used as the pressure generating fluid.

Next, embodiments of a second aspect of the present invention are described with reference to FIG. 24 to FIG. 41.

Figure 24:
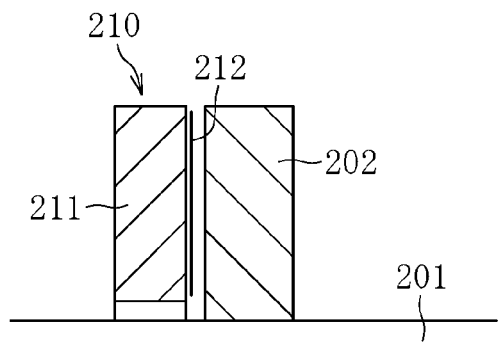
FIG. 24 is a sectional view for illustrating a thrust foil bearing according to an embodiment of a second aspect of the present invention.
Figure 24:
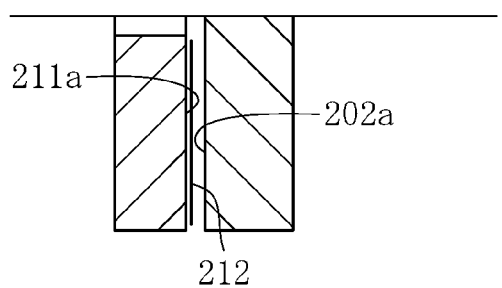

In FIG. 24, a thrust foil bearing 210 as a foil bearing according to an embodiment of the present invention is illustrated. The thrust foil bearing 210 is assembled into, for example, a gas turbine as a type of turbo machine, and is configured to support, in the thrust directions, a disc-like thrust collar 202 mounted to a shaft 201 rotatable to one side in the circumferential direction.

Figure 25:
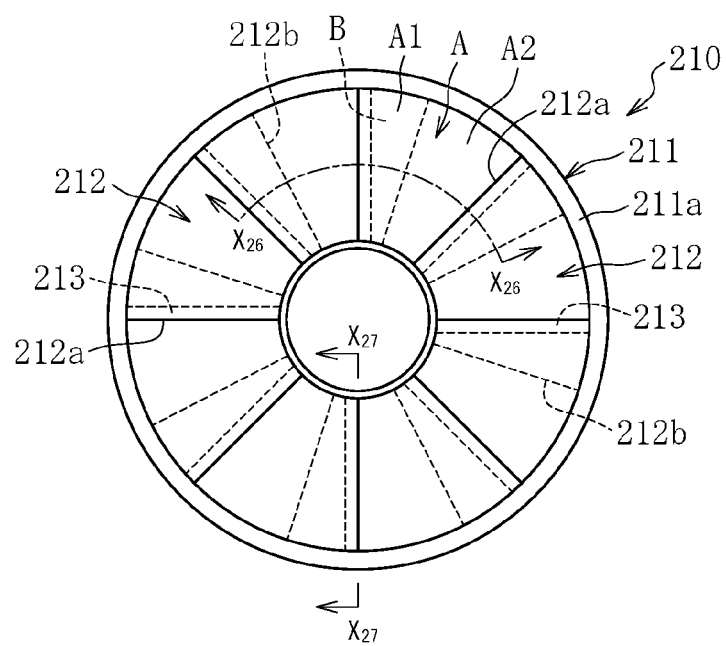
FIG. 25 is a plan view for illustrating the thrust foil bearing illustrated in FIG. 24.

The thrust foil bearing 210 comprises a foil holder 211 and a plurality of foils 212 (eight foils 212 in the illustrated example) mounted to the foil holder 211, as illustrated in FIG. 25. The foil holder 211 has a disc-like shape having a hole formed in an axial center. An end surface 211a of the foil holder 211 axially faces an end surface 202a of the thrust collar 202 (see FIG. 24). In the following description, the thrust collar 202 side with respect to each of the foils 212 in the axial direction is referred to as "upper side" and the foil holder 211 side with respect to each of the foils 212 in the axial direction is referred to as "lower side" for convenience of the description, which does not intend to limit a mode of use of the thrust foil bearing 210. In this embodiment, the shaft 201 is arranged horizontally, as illustrated in FIG. 24.

Each of the foils 212 is formed of a metal foil made of a metal that is excellent in resiliency and processability, such as a steel material or a copper alloy, and having a thickness of from approximately 20 μm to approximately 200 μm. It is preferred that the metal foil be made of stainless steel or bronze.

Figure 26:
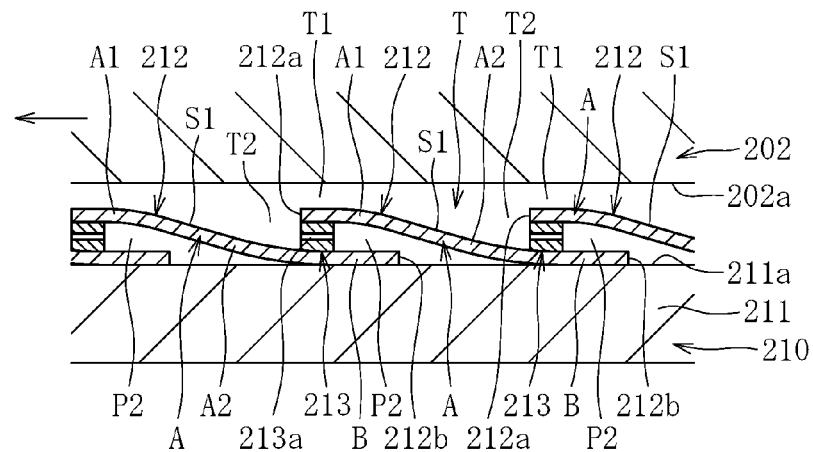
FIG. 26 is a sectional view taken along the line $X_{26}$-$X_{26}$ of FIG. 25.

The plurality of foils 212 are arranged equiangularly on the end surface 211a of the foil holder 211. As illustrated in FIG. 26, an end portion 212a (hereinafter referred to as "front end 212a") of each of the foils 212 on the one circumferential side is set as a free end, and is arranged so as to be overlapped on adjacent one of the foils 212 in the axial direction. A region including the front end 212a of each of the foils 212 forms a top foil portion A having the thrust bearing surface S1. The thrust bearing surfaces S1 of the plurality of foils 212 are provided continuously over the entire periphery in the circumferential direction. On the other hand, a region including an end portion 212b (hereinafter referred to as "rear end 212b") of each of the foils 212 on the another circumferential side forms a back foil portion B configured to support the top foil portion A of the adjacent one of the foils 212 from behind (lower side). Specifically, the back foil portion B of each of the foils 212 is arranged between the top foil portion A of the adjacent one of the foils 212 and the foil holder 211. The back foil portion B of each of the foils 212 is fixed to the end surface 211a of the foil holder 211 by a method such as welding. A size of a support member 213 is illustrated in an exaggerated manner in FIG. 26, and therefore the top foil portion A of each of the foils 212 and the back foil portion B of the adjacent one of the foils 212 are not held in contact with each other. In practice, however, a vertical dimension of the support member 213 is smaller than the illustration, and the top foil portion A of each of the foils 212 is supported by the back foil portion B of the adjacent one of the foils 212 from the lower side in a contact manner.

The support member 213 is provided between the top foil portion A of each of the foils 212 and the back foil portion B configured to support the top foil portion A from the lower side. In this embodiment, the support member 213 is provided below the front end 212a of each of the foils 212. The support member 213 has a shape along the front end 212a of each of the foils 212. In the illustrated example, the front end 212a of each of the foils 212 is formed linearly so as to extend in a radial direction. Along the front end 212a, the support member 213 extends over the entire radial length of each of the foils 212.

Figure 27:
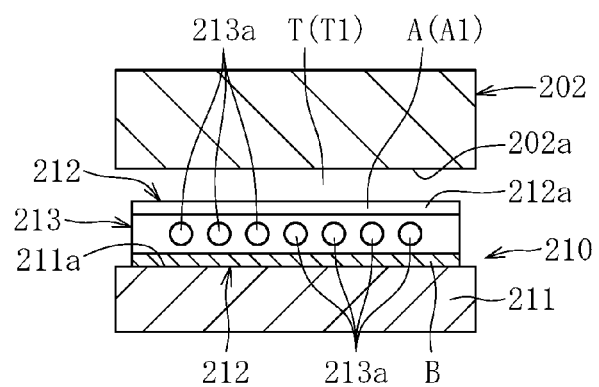
FIG. 27 is a sectional view taken along the line $X_{27}$-$X_{27}$ of FIG. 25.

As illustrated in FIG. 26 and FIG. 27, through holes 213a as communication paths are formed in the support member 213. The through holes 213a have openings on both circumferential end surfaces of the support member 213. The support member 213 is fixed to any one of a lower surface of the top foil portion A of each of the foils 212 or an upper surface of the back foil portion B configured to support the top foil portion A from the lower side. In this embodiment, the support member 213 is fixed to the upper surface of the back foil portion B of each of the foils 212 without being fixed to the top foil portion A of each of the foils 212.

When the shaft 201 and the thrust collar 202 are rotated integrally, a thrust bearing gap T is formed between the thrust bearing surface S1 of each of the foils 212 and the end surface 202a of the thrust collar 202, as illustrated in FIG. 26. When a pressure of a fluid (for example, air) in the thrust bearing gap T is increased, the thrust collar 202 is supported in one of the thrust directions in a non-contact manner. At this time, the thrust bearing surfaces S1 of the foils 212 are randomly deformed in accordance with operating conditions involving a load, a rotation speed of the shaft 201, and an ambient temperature due to flexibility of the foils 212. Therefore, the thrust bearing gap T is automatically adjusted to an appropriate width in accordance with the operating conditions. Therefore, even under severe conditions involving high temperature and high speed rotation, the thrust bearing gap T can be controlled to an optimal width, thereby enabling stable support of the shaft 201.

A region of the top foil portion A of each of the foils 212, which includes the front end 212a (hereinafter referred to as "front portion A1"), is supported from the lower side by the back foil portion B of the adjacent one of the foils 212. On the other hand, a region of the top foil portion A of each of the foils 212, which includes a rear end of the top foil portion A (boundary with the back foil portion B) (hereinafter referred to as "rear portion A2"), is not supported from the lower side by the back foil portion B, and directly faces the end surface 211a of the foil holder 211. Thus, the top foil portion A of each of the foils 212 is curved, and hence the front portion A1 of the top foil portion A is brought closer to the thrust collar 202 than the rear portion A2. In this manner, a thrust bearing gap (small gap portion T1) having a relatively small gap width is formed between the thrust bearing surface S1 of the front portion A1 of each of the top foil portions A and the end surface 202a of the thrust collar 202. Further, a thrust bearing gap (large gap portion T2) having a relatively large gap width is formed between the thrust bearing surface S2 of the rear portion A2 of each of the top foil portions A and the end surface 202a of the thrust collar 202. In the illustrated example, in particular, the top foil portion A of each of the foils 212 is supported from the lower side by the support member 213. Therefore, a difference between the small gap portion T1 and the large gap portion T2 becomes larger.

The fluid flowing in the thrust bearing gap T along with the rotation of the shaft 201 flows from the large gap portion T2 into the small gap portion T1 to have an increased pressure, thereby generating a force for supporting the thrust collar 202. At this time, the fluid having the pressure increased in the small gap portion T1 flows into the large gap portion T2 so that the pressure is suddenly lowered. Therefore, there is a fear of generation of a negative pressure in the large gap portions T2. In this embodiment, the large gap portions T2 and a space P2 between each of the foils 212 and the foil folder 211 are brought into communication with each other through communication paths (through holes 213a) formed in the support member 213. Therefore, when the pressure in the large gap portions T2 is lowered, the fluid flows from the above-mentioned space P2 through the through holes 213a, thereby maintaining the pressure in the large gap portions T2. As a result, the large gap portions T2 are constantly kept in a state at a pressure close to an atmospheric pressure, thereby preventing the generation of the negative pressure in the large gap portions T2.

During the low speed rotation immediately before the stop or immediately after the actuation of the shaft 201, the thrust bearing surface S1 of each of the foils 212 and the end surface 202a of the thrust collar 202 come into sliding contact with each other. Thus, low-friction coating such as a DLC film, a titanium aluminum nitride film, a tungsten disulfide film, and a molybdenum disulfide film may be formed on one or both of the thrust bearing surface S1 of each of the foils 212 and the end surface 202a of the thrust collar 202. Further, in order to adjust a friction force between the foils 212 and the foil holder 211 during operation of the bearing, the low-friction coating as described above may be formed on one or both of the foils 212 and the foil holder 211.

The present invention is not limited to the embodiments described above. Now, description is made of other embodiments of the present invention. Parts having the same functions as those in the embodiments described above are denoted by the same reference symbols, and redundant description thereof is omitted.

Figure 28:
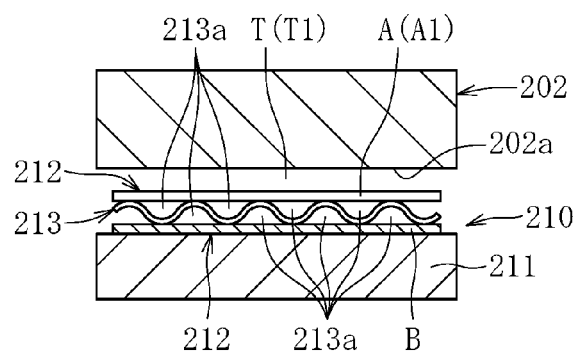
FIG. 28 is a sectional view for illustrating the thrust foil bearing according to another embodiment of the second aspect of the present invention.

The communications paths are formed by the through holes 213a in the support member 213 in the embodiment described above, but the communication paths are not limited thereto. For example, a plate-like component having concavity and convexity may be used as the support member 213 as illustrated in FIG. 28. In the illustrated example, a corrugated plate-like component is used so that the communication paths are formed by gaps formed with the component. Besides, the communication paths may be formed with a plate-like component having circumferential grooves or a plate-like component having dimple-like projections (not shown).

Figure 29:
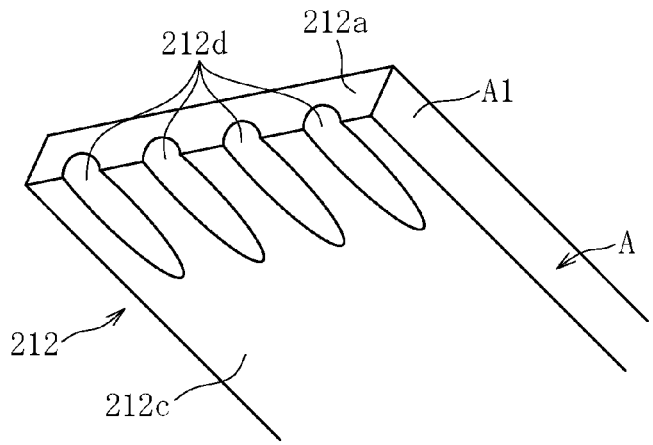
FIG. 29 is a perspective view for illustrating a foil of the thrust foil bearing according to still another embodiment of the second aspect of the present invention.
Figure 30:
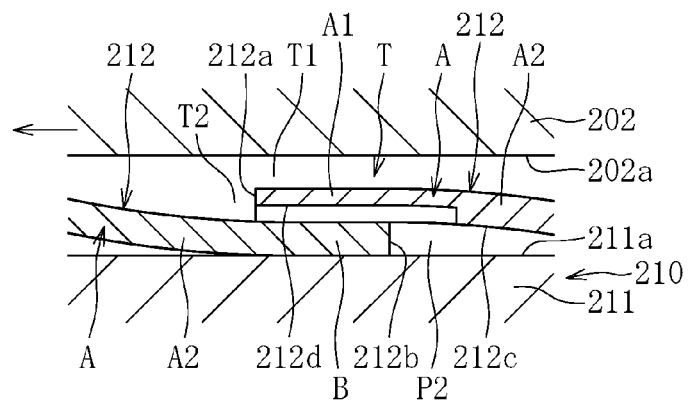
FIG. 30 is a sectional view for illustrating the thrust foil bearing comprising the foils illustrated in FIG. 29.
Figure 31:
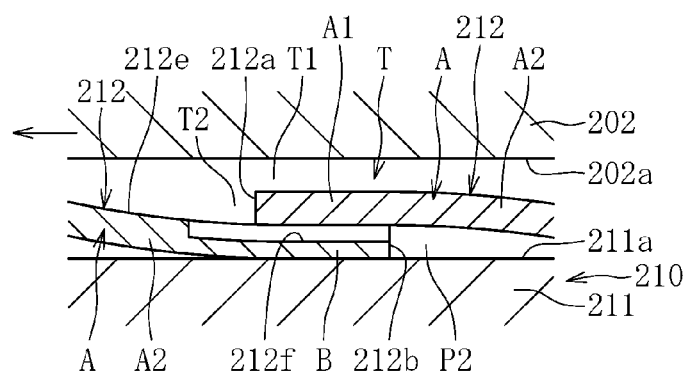
FIG. 31 is a plan view for illustrating a thrust foil bearing according to yet another embodiment of the second aspect of the present invention.

In an embodiment of the present invention, which is illustrated in FIG. 29 and FIG. 30, circumferential grooves 212d are formed on a lower surface 212c of the front portion A1 of the top foil portion A of each of the foils 212. End portions of the circumferential grooves 212d on the one circumferential side have openings on the front end 212a of each of the foils 212, whereas end portions of the circumferential grooves 212d on the another circumferential side extend beyond the back foil portion B configured to support the foil 212 to the another circumferential side. The circumferential grooves 212d formed in each of the foils 212 function as the communication paths configured to bring the large gap portion T2 and the space P2 below each of the foils 212 into communication with each other. Further, as illustrated in FIG. 31, circumferential grooves 212f that function as the communication paths may be formed on an upper surface 212e of the back foil portion B of each of the foils 212. End portions of the circumferential grooves 212f on the one circumferential side reach the rear portion A2 of the top foil portion A of the foil 212, whereas end portions of the circumferential grooves 212f on the another circumferential side have openings on the rear end 212b of the foil 212. Alternatively, the circumferential grooves 212d and 212f may be both formed.

Figure 32:
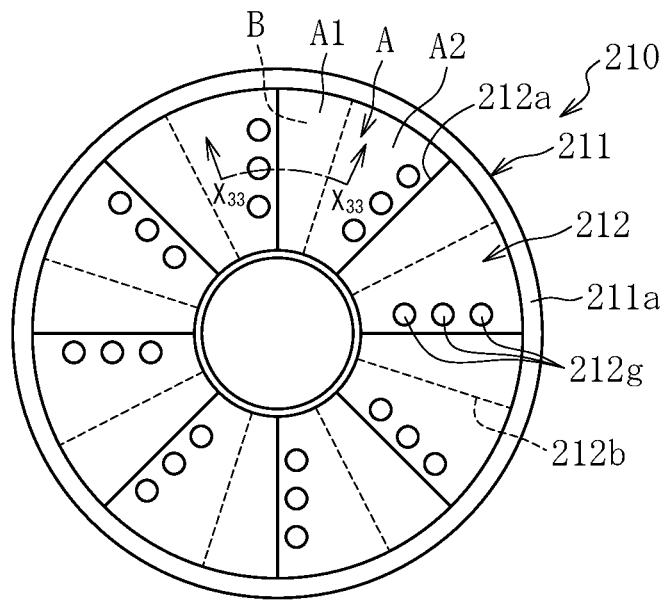
FIG. 32 is a plan view for illustrating a thrust foil bearing according to yet another embodiment of the second aspect of the present invention.
Figure 33:
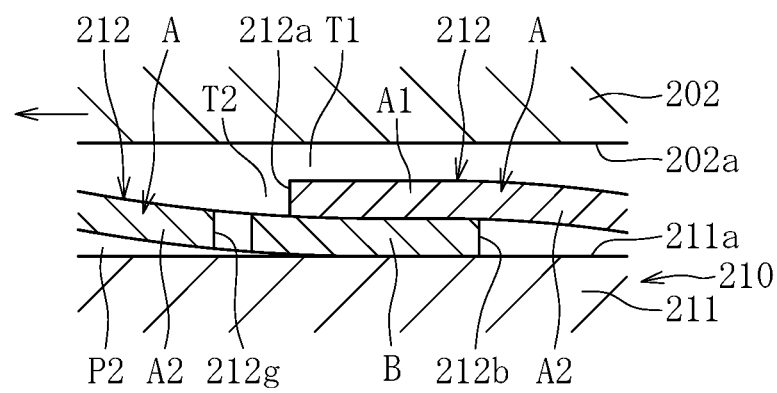
FIG. 33 is a sectional view taken along the line $X_{33}$-$X_{33}$ of FIG. 32.

The large gap portion T2 formed above each of the foils 212 and the space P2 below the adjacent one of the foils 212 are brought into communication with each other through the communication paths in the embodiments described above, but the communication paths are not limited thereto. For example, as illustrated in FIG. 32 and FIG. 33, through holes 212g passing through each of the foils 212 in a thickness direction may be formed as the communication paths. In this case, the large gap portion T2 formed above each of the foils 212 and the space P2 formed below the foil 212 are brought into communication with each other through the through holes 212g. In the illustrated example, the through holes 212g are formed in the rear portion A2 of the top foil portion A of each of the foils 212, in particular, in the vicinity of the boundary with the back foil portion B. Further, in the illustrated example, the plurality of through holes 212g are formed in each of the foils 212, in particular, at a plurality of positions (three positions in the illustrated example) that are radially separated from each other.

Figure 34:
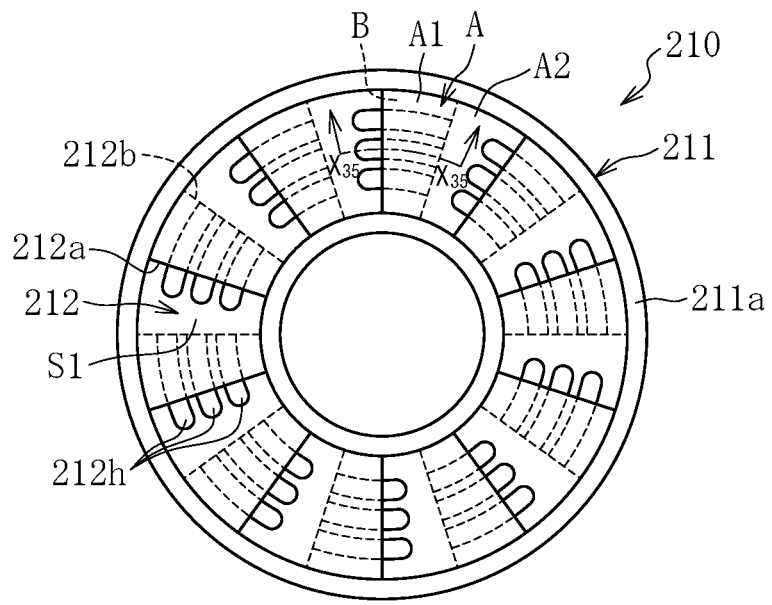
FIG. 34 is a plan view for illustrating a thrust foil bearing according to yet another embodiment of the second aspect of the present invention.
Figure 35:
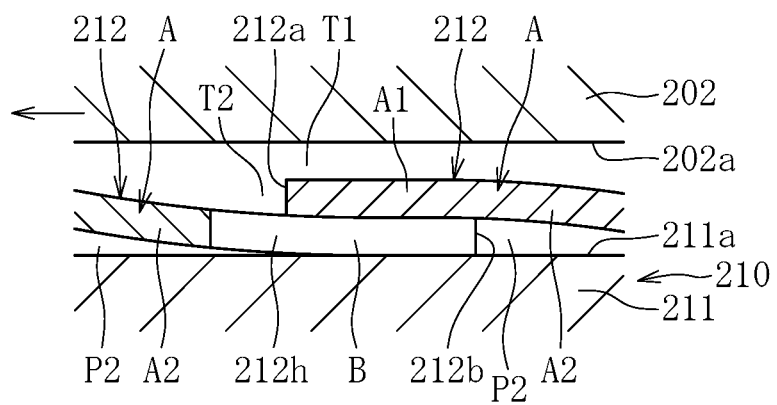
FIG. 35 is a sectional view taken along the line $X_{35}$-$X_{35}$ of FIG. 34.

In an embodiment of the present invention, which is illustrated in FIG. 34 and FIG. 35, cutouts 212h formed in each of the foils 212 form the communication paths. In the illustrated example, the circumferential cutouts 212h extending from the rear end 212b of each of the foils 212 to the rear portion A2 of the top foil portion A through the back foil portion B are formed. Further, in the illustrated example, the plurality of cutouts 212h that are radially separated from each other are formed in each of the foils 212. Through the cutouts 212h formed in each of the foils 212, the large gap portion T2 formed above each of the foils 212 is brought into communication with both the space P2 formed below each of the foils 212 and the space P2 formed below the adjacent one of the foils 212 during the rotation of the shaft 201.

Figure 36:
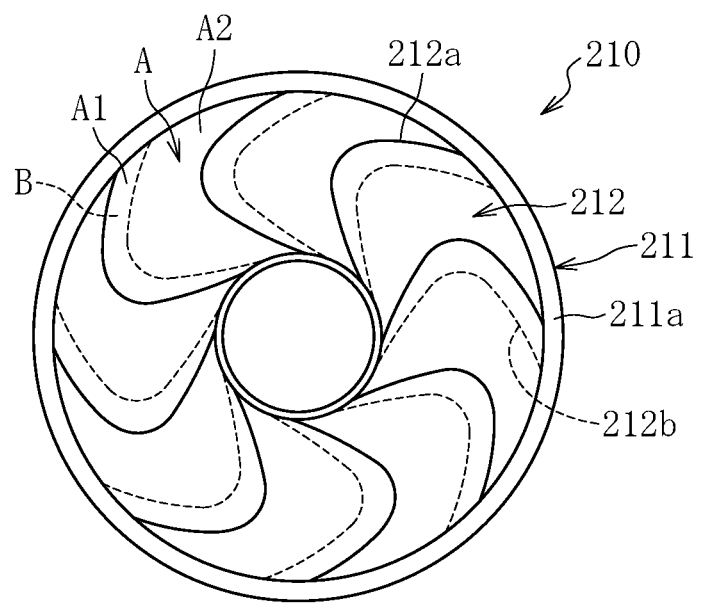
FIG. 36 is a plan view for illustrating a thrust foil bearing according to yet another embodiment of the second aspect of the present invention.

The shape of each of the foils 212 is not limited to those of the embodiments described above. For example, in an embodiment of the present invention, which is illustrated in FIG. 36, the rear end 212b of each of the foils 212 has a central portion having a herringbone pattern that projects to the one circumferential side. The front end 212a of the adjacent one of the foils 212 overrides on the rear end 212b having the herringbone pattern to form a step having a herringbone pattern on the thrust bearing surface S1 of the foil 212 so that the fluid flowing to the one side in the circumferential direction is collected in the radial center. In the illustrated example, the front ends 212a of the foils 212 are also formed into the same herringbone pattern as that of the rear ends 212b. Further, the communication paths as described in the embodiments described above are formed in the foil bearing 210 illustrated in FIG. 36, but the illustration of the communication paths is omitted.

Figure 37:
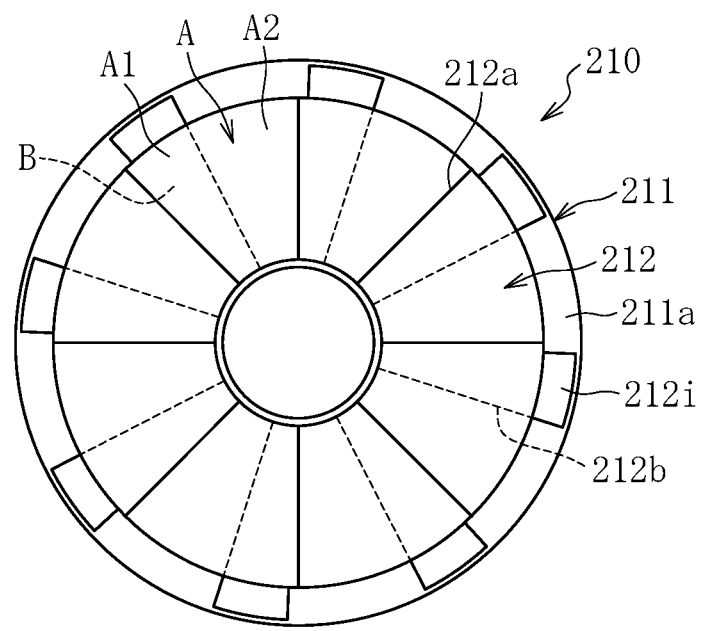
FIG. 37 is a plan view for illustrating a thrust foil bearing according to yet another embodiment of the second aspect of the present invention.

A method of fixing the foils 212 to the foil holder 211 is not limited to that of the embodiments described above. For example, in an embodiment of the present invention, which is illustrated in FIG. 37, an extended portion 212i is provided on a radially outer side with respect to the thrust bearing surface S1 of each of the foils 212. The extended portion 212i is fixed to the end surface 211a of the foil holder 211 by a method such as welding. In this case, a fixing portion between the foil 212 and the foil holder 211 is not provided below the thrust bearing surface S1 of each of the foils 212. The communication paths described in the embodiments described above are formed in the foil bearing 210 illustrated in FIG. 37, but the illustration of the communication paths is omitted.

Next, a radial foil bearing to which the present invention is applied is described.

Figure 38:
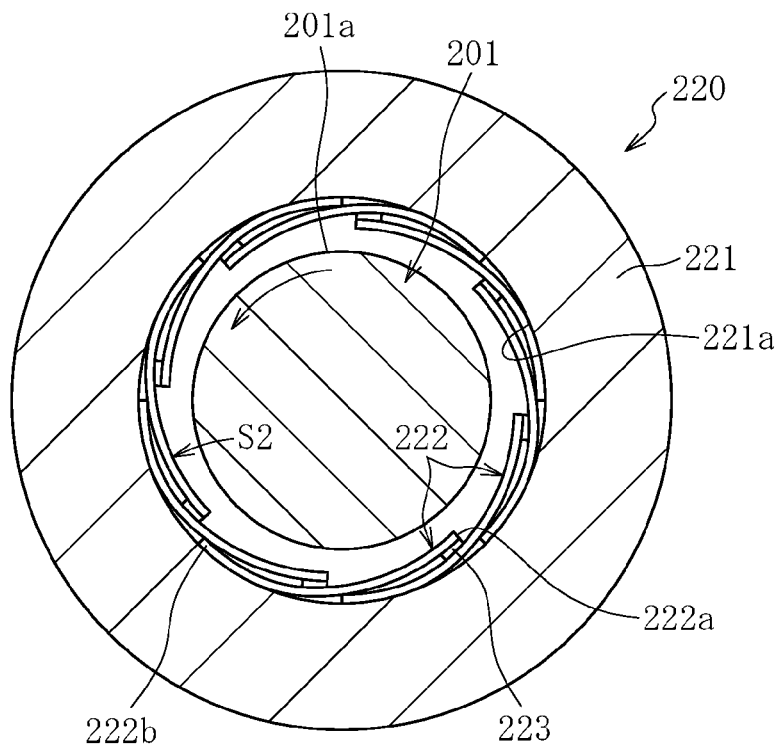
FIG. 38 is a sectional view for illustrating a radial foil bearing according to an embodiment of the second aspect of the present invention.

In FIG. 38, a radial foil bearing 220 as a foil bearing according to an embodiment of the present invention is illustrated. The radial foil bearing 220 is assembled into, for example, a gas turbine as a type of turbo machine, and is configured to support, in the radial direction, the shaft 201 rotatable to one side in the circumferential direction.

The radial foil bearing 220 comprises a cylindrical foil holder 221 having the shaft 201 inserted along an inner periphery thereof, and a plurality of foils 222 (eight foils 222 in the illustrated example) mounted to an inner peripheral surface 221a of the foil holder 221.

Figure 39:
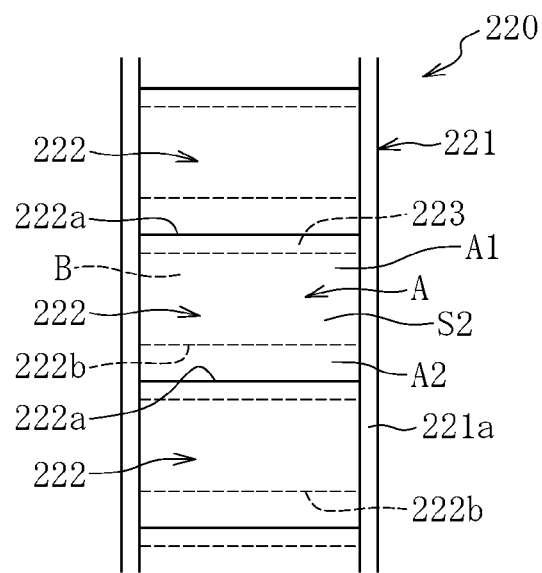
FIG. 39 is a developed plan view for illustrating the radial foil bearing.
Figure 40:
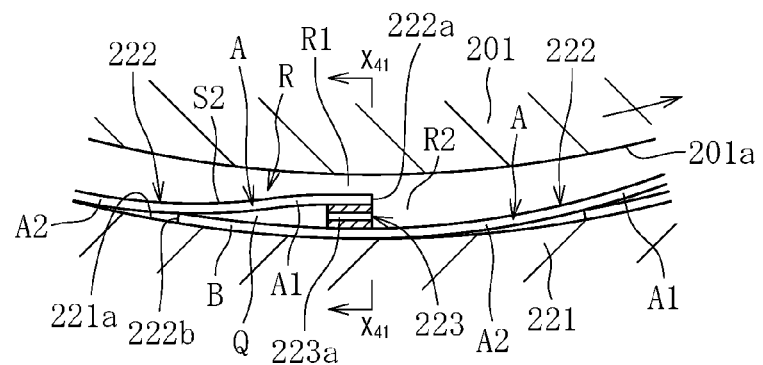
FIG. 40 is an enlarged view of FIG. 38.

The plurality of foils 222 are arrayed equiangularly on the inner peripheral surface 221a of the foil holder 221. An end portion 222a (hereinafter referred to as "front end 222a") of each of the foils 222 on one circumferential side is arranged so as to be overlapped on a radially inner side of adjacent one of the foils 222. As illustrated in FIG. 39 and FIG. 40, a region including the front end 222a of each of the foils 222 forms the top foil portion A having a radial bearing surface S2. The radial bearing surfaces S2 of the plurality of foils 222 are provided continuously over the entire periphery in the circumferential direction. On the other hand, a region including an end portion 222b of each of the foils 222 on another circumferential side (hereinafter referred to as "rear end 222b") forms the back foil portion B configured to support the top foil portion A of the adjacent one of the foils 222 from behind (radially outer side). Specifically, the back foil portion B of each of the foils 222 is arranged between the top foil portion A of the adjacent one of the foils 222 and the foil holder 221. The back foil portion B of each of the foils 222 is fixed to the inner peripheral surface 221a of the foil holder 221 by a method such as welding. A material and a thickness of the foil 222 are the same as those of the foil 212 of the thrust foil bearing 210 described above.

A support member 223 is provided between the top foil portion A of each of the foils 222 and the back foil portion B configured to support the top foil portion A from a lower side (see FIG. 40). In this embodiment, the support member 223 is provided on a radially outer side with respect to the front end 222a of each of the foils 222. The support member 223 is formed into a shape along the front end 222a of each of the foils 222. In the illustrated example, the front end 222a of each of the foils 222 is formed linearly so as to extend in the axial direction. Along the front end 222a, the support member 223 extends over the entire axial length of each of the foils 222 (see FIG. 39).

Figure 41:
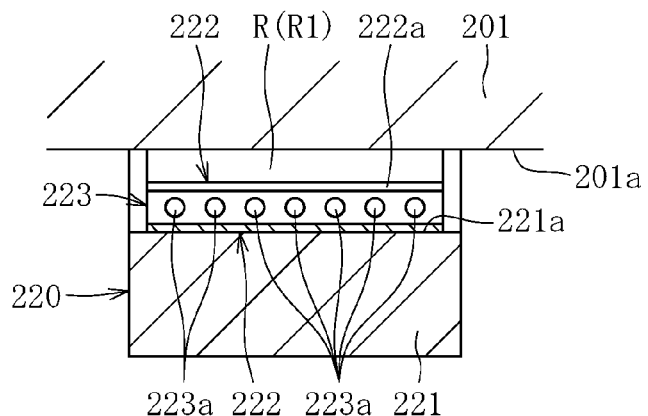
FIG. 41 is a sectional view taken along the line $X_{41}$-$X_{41}$ of FIG. 40.
Figure 42:
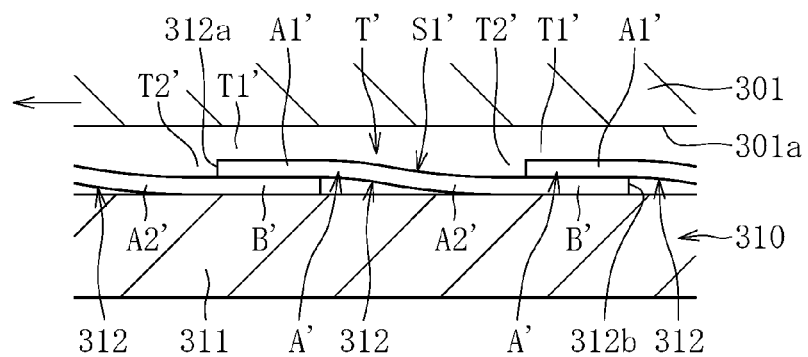
FIG. 42 is a sectional view for illustrating a related-art thrust foil bearing.

Through holes 223a having openings on both circumferential end surfaces of the support member 223 are formed as the communication paths in the support member 223. In this embodiment, as illustrated in FIG. 41, the through holes 223a are formed at a plurality of positions that are separated from each other in the axial direction. The support member 223 is fixed to any one of a radially outer surface of the top foil portion A of each of the foils 222 and a radially inner surface of the back foil portion B configured to support the top foil portion A from the lower side. In this embodiment, the support member 223 is fixed to the radially inner surface of the back foil portion B of each of the foils 222 without being fixed to the top foil portion A of each of the foils 222.

When the shaft 201 is rotated, a radial bearing gap R is formed between the radial bearing surface S2 of each of the foils 222 and an outer peripheral surface 201a of the shaft 201, as illustrated in FIG. 40. A pressure of the fluid (for example, air) in the radial bearing gap R is increased, thereby supporting the shaft 201 in the radial direction in a non-contact manner.

At this time, a region of the top foil portion A of each of the foils 222, which includes the front end 222a (hereinafter referred to as "front portion A1"), is supported from the radially outer side by the back foil portion B of the adjacent one of the foils 222. On the other hand, a region of the top foil portion A of each of the foils 222, which includes a rear end of the top foil portion A (boundary with the back foil portion B) (hereinafter referred to as "rear portion A2"), is not supported by the back foil portion B from the lower side and directly faces the inner peripheral surface 221a of the foil holder 221. As a result, the top foil portion A of each of the foils 222 is curved so as to bring the front portion A1 of the top foil portion A closer to the outer peripheral surface 201a of the shaft 201 than the rear portion A2. In this manner, a radial bearing gap (small gap portion R1) having a relatively small gap width is formed between the radial bearing surface S2 of the front portion A1 of each of the top foil portions A and the outer peripheral surface 201a of the shaft 201. Further, a radial bearing gap (large gap portion R2) having a relatively large gap width is formed between the radial bearing surface S2 of the rear portion A2 of each of the top foil portions A and the outer peripheral surface 201a of the shaft 201.

The fluid flowing in the radial bearing gap R along with the rotation of the shaft 201 flows from the large gap portion R2 into the small gap portion R1 to have an increased pressure, thereby generating a force for supporting the shaft 201. At this time, the fluid having the pressure increased in the small gap portion R1 flows into the large gap portion R2 to have the suddenly decreased pressure, thereby causing a fear of generation of a negative pressure in the large gap portion R2. In this embodiment, the large gap portion R2 and a space Q between each of the foils 222 and the foil holder 221 are brought into communication with each other through the communication paths (through holes 223a) formed in the support member 223. Thus, the pressure in the large gap portion R2 is maintained to prevent the generation of the negative pressure in the large gap portion R2.

Low-friction coating such as a DLC film, a titanium aluminum nitride film, a tungsten disulfide film, and a molybdenum disulfide film may be formed on one or both of the radial bearing surface S2 of each of the foils 222 and the outer peripheral surface 201a of the shaft 201. Further, the low-friction coating as described above may be formed on one or both of a radially outer surface of the foils 222 and the inner peripheral surface 221a of the foil holder 221.

The other embodiments (see FIG. 28 to FIG. 37) described for the thrust foil bearing 210 may be applied to the radial foil bearing 220.

The foil bearing according to the present invention may be used not only as turbo machines such as the gas turbine and the supercharger, but widely used also as bearings for vehicles such as automobiles. The foil bearing according to the present invention may be widely used also as bearings for industrial devices.

Further, the foil bearings described above are each an air dynamic pressure bearing that uses air as a pressure generating fluid. However, the present invention is not limited thereto, and other gases or liquids such as water and oil may be used as the pressure generating fluid.

Next, embodiments of a third aspect of the present invention are described with reference to FIG. 43 to FIG. 52.

Figure 43:
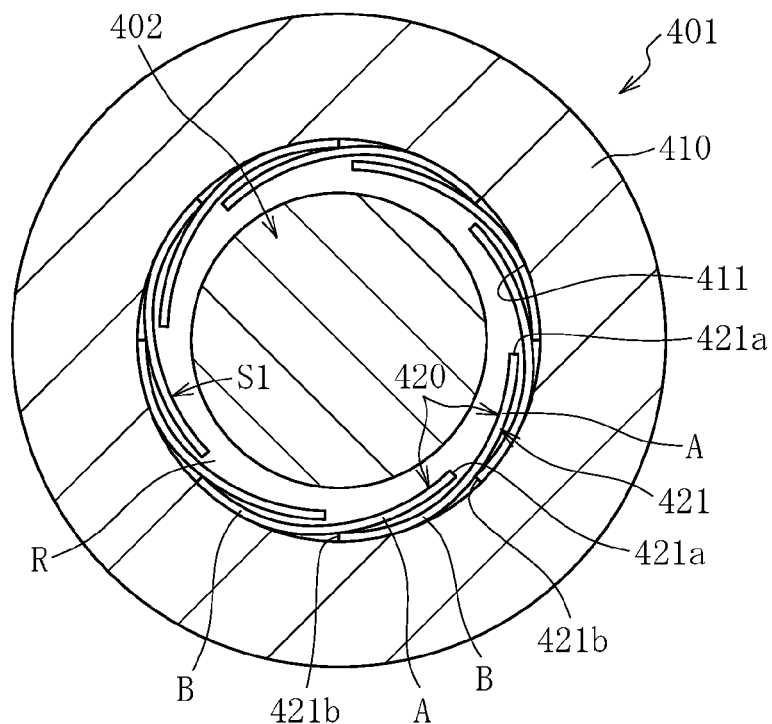
FIG. 43 is a sectional view for illustrating a radial foil bearing according to an embodiment of a third aspect of the present invention.

In FIG. 43, a radial foil bearing 401 as a foil bearing according to an embodiment of the present invention is illustrated. The radial foil bearing 401 is assembled into, for example, a gas turbine as a type of turbo machine, and is configured to support, in the radial direction, a shaft 402 rotatable to one side in the circumferential direction. The radial foil bearing 401 comprises a tubular foil holder 410 (cylindrical foil holder 410 in the illustrated example) having the shaft 402 inserted along an inner periphery thereof, and a plurality of foils 420 (eight foils 420 in the illustrated example) mounted to an inner peripheral surface 411 of the foil holder 410 so as to be arrayed in the circumferential direction.

Each of the foils 420 is formed of a metal foil made of a metal that is excellent in resiliency and processability, such as a steel material or a copper alloy, having a thickness of from approximately 20 μm to approximately 200 μm. It is preferred that the metal foil be made of stainless steel or bronze.

Figure 44:
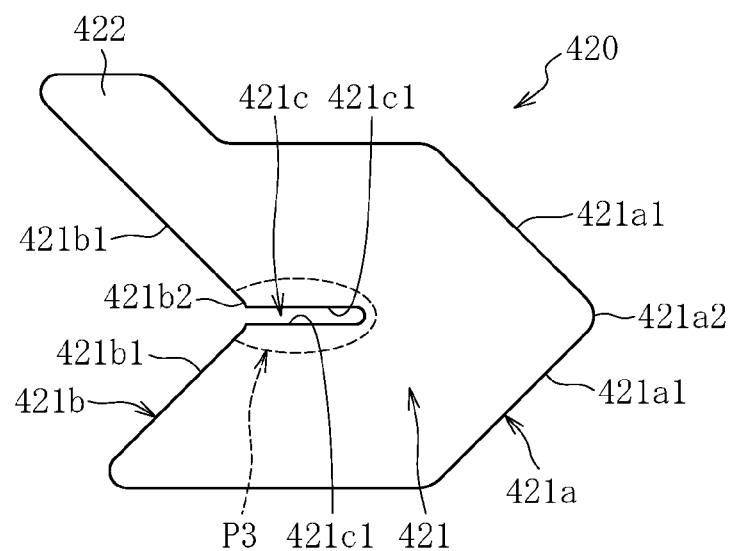
FIG. 44 is a plan view for illustrating a foil to be assembled into the radial foil bearing illustrated in FIG. 43.

Each of the foils 420 integrally comprises a body portion 421 and a fixing portion 422 provided to one axial side of the body portion 421 (upper side in FIG. 44), as illustrated in FIG. 44. The fixing portion 422 of each of the foils 420 is fixed to the inner peripheral surface 411 of the foil holder 410 by a suitable method such as welding. An end portion of the body portion 421 on one circumferential side (hereinafter referred to as "front end 421a") and an end portion of the body portion 421 on another circumferential side (hereinafter referred to as "rear end 421b") both form a herringbone pattern. Specifically, the front end 421a comprises a pair of inclined portions 421a1 inclined to the one circumferential side from both axial ends toward an axial center. An approximately arc-like top portion 421a2 is provided between the pair of inclined portions 421a1 so as to smoothly connect the inclined portions 421a1. The rear end 421b comprises a pair of inclined portions 421b1 inclined to the one circumferential side from both the axial ends toward the axial center. An approximately arc-like bottom portion 421b2 is provided between the pair of inclined portions 421b1 so as to smoothly connect the inclined portions 421b1. In the illustrated example, the bottom portion 421b2 of the rear end 421b is divided by a slit 421c described later. Shapes of the front end 421a and the rear end 421b are not limited to those described above. For example, the pair of inclined portions 421a1 or the pair of inclined portions 421b1 may be connected by an axially linear top portion. Alternatively, the pair of inclined portions 421a1 or the pair of inclined portion 421b1 may be directly connected.

Figure 45:
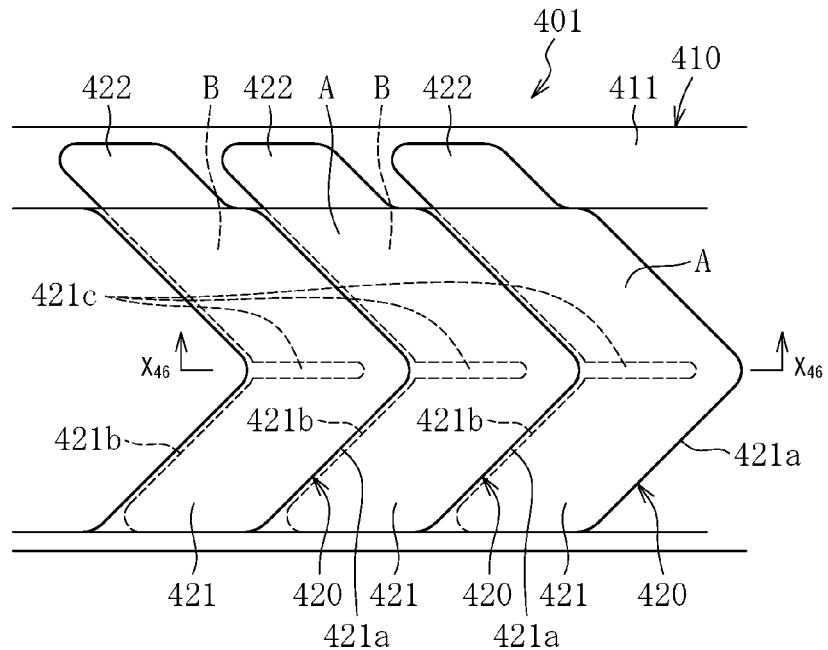
FIG. 45 is a developed plan view for illustrating an inner peripheral surface of the radial foil bearing illustrated in FIG. 43.
Figure 46A:
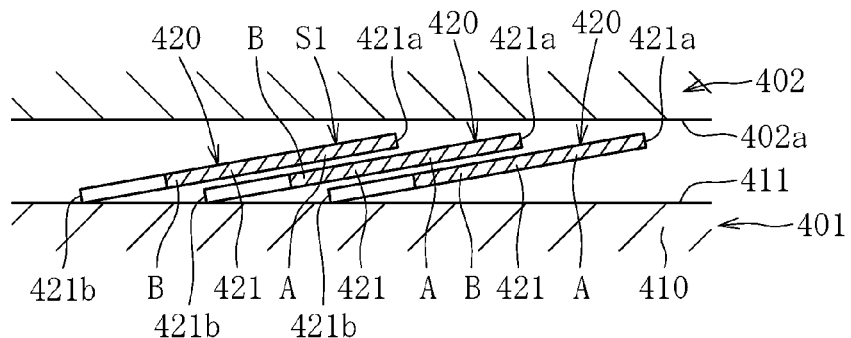
FIG. 46A is a sectional view taken along the line $X_{46}$-$X_{46}$ of FIG. 45, for illustrating a state in which a shaft is stopped.

As illustrated in FIG. 45 and FIG. 46A, the front end 421a of the body portion 421 of each of the foils 420 is arranged on the body portion 421 (radially inner side) of adjacent one of the foils 420. A region including the front end 421a of each of the foils 420 forms the top foil portion A having the radial bearing surface S1. The radial bearing surfaces S1 of the plurality of foils 420 are provided continuously over the entire periphery in the circumferential direction. On the other hand, a region including the read end 421b of each of the foils 420 forms the back foil portion B configured to support the top foil portion A of the adjacent one of the foils 420 from behind (radially outer side). The back foil portion B of each of the foils 420 is arranged between the top foil portion A of the adjacent one of the foils 420 and the foil holder 410.

As illustrated in FIG. 44, a fragile portion P3 is formed on an axially intermediate portion of the back foil portion B of each of the foils 420. The fragile portion P3 has lower strength to a compressive stress (hereinafter referred to as "compressive strength") than regions on both axial sides thereof, in particular, has low compressive strength in the axial direction. In this embodiment, the slit 421c extending in the circumferential direction is formed in the axial center portion of the back foil portion B to lower the compressive strength of the fragile portion P3. Inner walls 421c1 of the slit 421c, which face each other, are separated from each other in the axial direction. The slit 421c reaches the rear end 421b of the body portion 421. The slit 421c of the illustrated example extends from the bottom portion 421b2 of the rear end 421b of the body portion 421 to the one circumferential side. The slit 421c does not reach the top foil portion A, and is formed within the region of the back foil portion B (see FIG. 45).

Figure 46B:
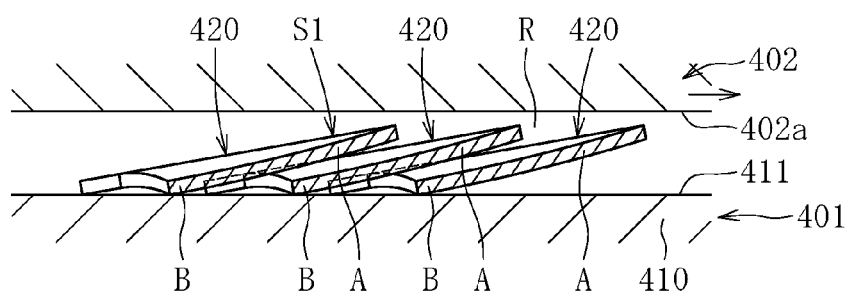
FIG. 46B is a sectional view taken along the line $X_{46}$-$X_{46}$ of FIG. 45, for illustrating a state in which the shaft is rotated.

When the shaft 402 is rotated, a pressure of the fluid (for example, air) in the radial bearing gap R formed between the radial bearing surface S1 of each of the foils 420 and an outer peripheral surface 402a of the shaft 402 is increased, as illustrated in FIG. 46B. By the fluid pressure, the shaft 402 is supported in the radial direction in a non-contact manner. At this time, the radial bearing surfaces S1 of the foils 420 are randomly deformed in accordance with operating conditions involving a load, a rotation speed of the shaft 402, and an ambient temperature due to flexibility of the foils 420. Thus, the radial bearing gap R is automatically adjusted to an appropriate width in accordance with the operating conditions. Therefore, even under severe conditions involving high temperature and high speed rotation, the radial bearing gap R may be managed so as to have an optimal width, and hence the shaft 402 may be stably supported.

At this time, each of the foils 420 is pressed to the radially outer side by the fluid pressure in the radial bearing gap R.

Figure 47:
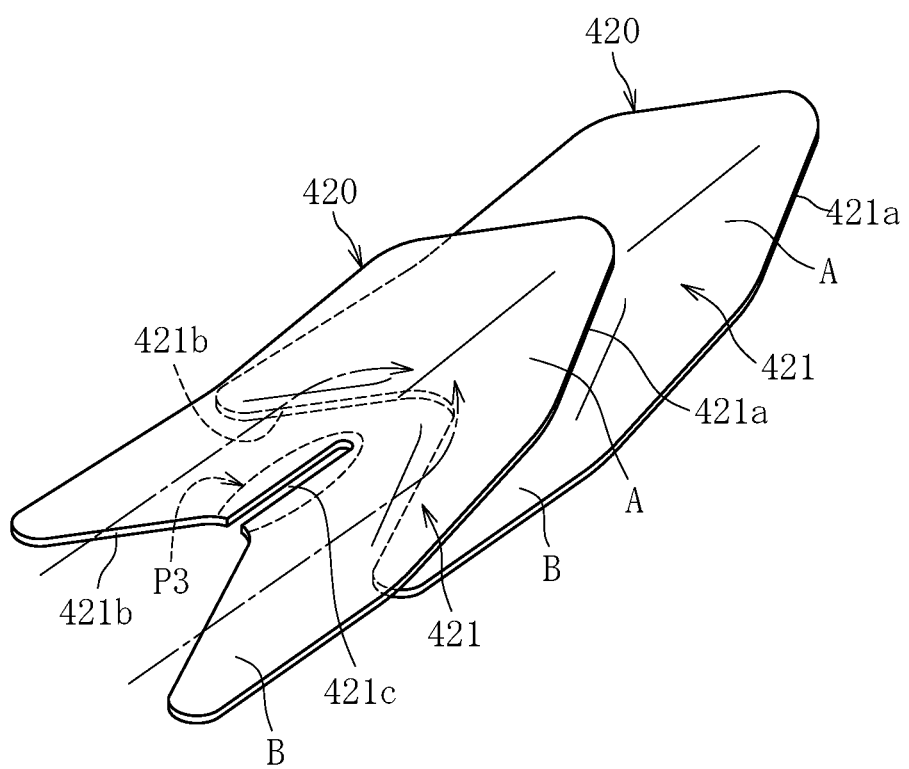
FIG. 47 is a perspective view for illustrating a state in which the foil is deformed into a boat-like shape.

As a result, each of the foils 420 is deformed into a boat-like shape along the rear end 421b (inclined portions 421b1) having the herringbone pattern in the back foil portion B, which is arranged behind (on the radially outer side of) the foil 420, as illustrated in FIG. 47. Specifically, the front end 421a of the top foil portion A and both axial ends of each of the foils 420 are warped upward to the radially inner side. As a result, the fluid flowing in the radial bearing gap R along with the rotation of the shaft 402 is collected to an axial center side along the top foil portion A (see the arrows in the chain lines in FIG. 47), thereby efficiently increasing the fluid pressure in the axial center portion.

Figure 48A:
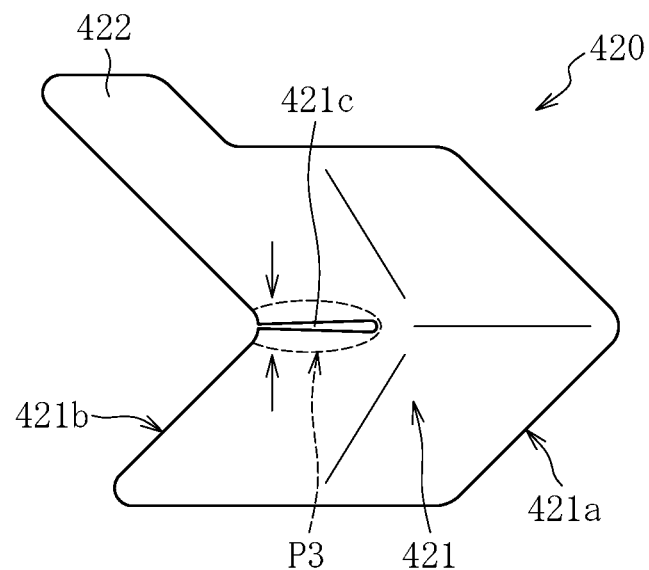
FIG. 48A is a plan view for illustrating the foil that is deformed into the boat-like shape.
Figure 48B:
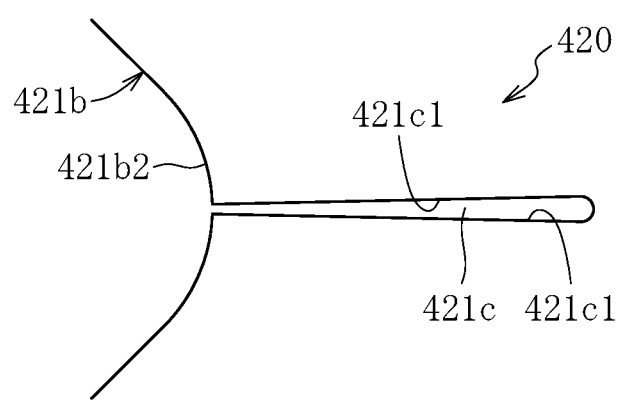
FIG. 48B is an enlarged view of FIG. 48A.

When each of the foils 420 is deformed into the boat-like shape as described above, the compressive stress is applied to the axial center portion of the back foil portion B from both the axial sides as indicated by the arrows in FIG. 48A. In this embodiment, the fragile portion P3 is provided in the axial center portion of the back foil portion B. Therefore, the fragile portion P3 is easily deformed under the above-mentioned compressive stress. Specifically, as illustrated in FIG. 48B, the inner walls 421c1 of the slit 421c on both the axial sides come closer to each other to compressively deform the fragile portion P3 in the axial direction. In the illustrated example, the slit 421c reaches the rear end 421b of the body portion 421, to which the compressive stress is likely to be applied. Therefore, the compressive deformation of the fragile portion P3 is further promoted. In this manner, even when the shaft 402 is rotated at low speed, each of the foils 420 can be deformed into the boat-like shape to efficiently increase the fluid pressure in the radial bearing gap R so as to support the shaft 402 in a non-contact manner.

Low-friction coating such as a DLC film, a titanium aluminum nitride film, a tungsten disulfide film, and a molybdenum disulfide film may be formed on one or both of the radial bearing surface S1 of each of the foils 420 and the outer peripheral surface 402a of the shaft 402. Further, the low-friction coating as described above may be formed on one or both of a radially outer surface of the foils 420 and the inner peripheral surface 411 of the foil holder 410.

Next, a thrust foil bearing to which the present invention is applied is described.

Figure 49:
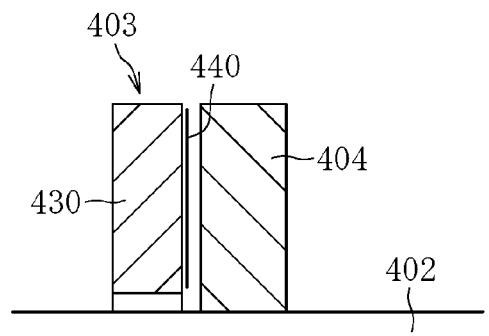
FIG. 49 is a sectional view for illustrating a thrust foil bearing according to an embodiment of the third aspect of the present invention.
Figure 49:
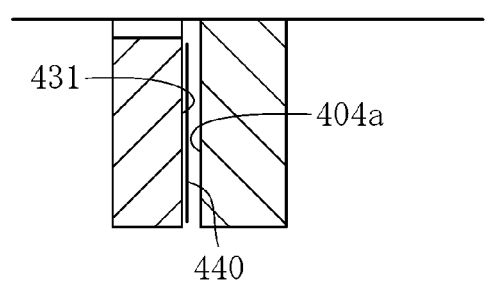
Figure 50:
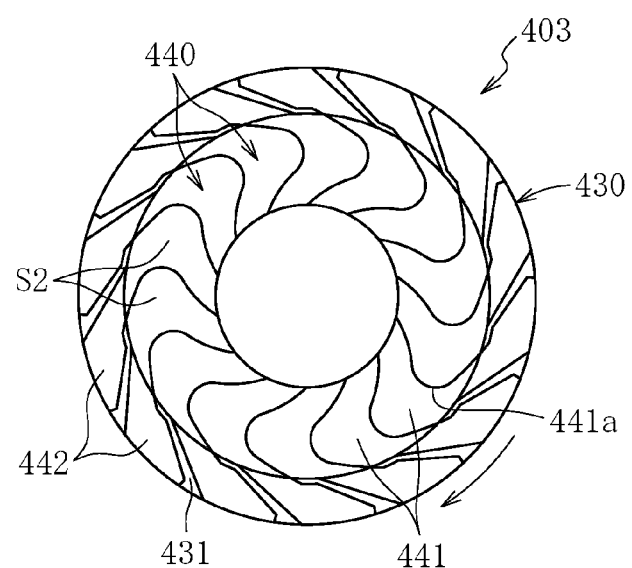
FIG. 50 is a plan view for illustrating the thrust foil bearing illustrated in FIG. 49.

In FIG. 49 and FIG. 50, a thrust foil bearing 403 as a foil bearing according to an embodiment of the present invention is illustrated. The thrust foil bearing 403 is assembled into, for example, a gas turbine as a type of turbo machine, and is configured to support, in the thrust directions, a thrust collar 404 mounted to the shaft 402 rotatable to one side in the circumferential direction. The thrust foil bearing 403 comprises a foil holder 430 and a plurality of foils 440 mounted to the foil holder 430 so as to be arrayed in the circumferential direction.

An end surface 431 of the foil holder 430 axially faces an end surface 404a of the thrust collar 404. The foil holder 430 has a disc-like shape having a hole formed in an axial center. In the following description, the thrust collar 404 side with respect to each of the foils 440 in the axial direction is referred to as "upper side", and the foil holder 430 side with respect to each of the foils 440 in the axial direction is referred to as "lower side" for convenience of the description, which does not intend to limit a mode of use of the thrust foil bearing 430. In this embodiment, the shaft 402 is arranged horizontally as illustrated in FIG. 49.

Figure 51:
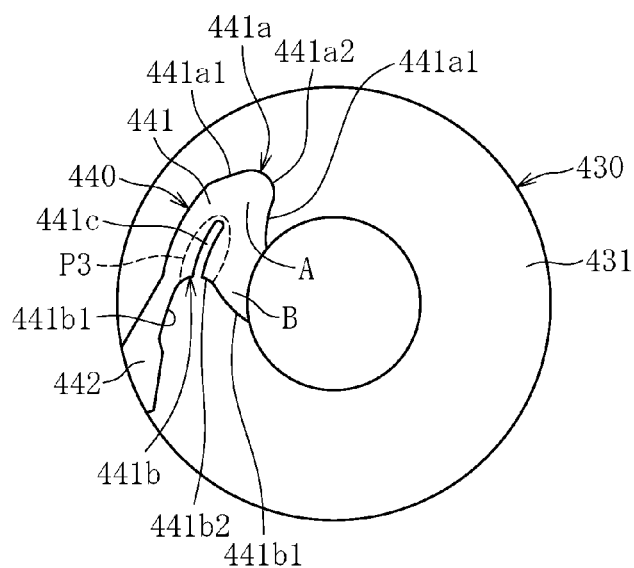
FIG. 51 is a plan view for illustrating a foil to be assembled into the thrust foil bearing illustrated in FIG. 49.

A material and a thickness of each of the foils 440 are the same as those of the foil 420 of the radial foil bearing 401 described above. Each of the foils 440 integrally comprises a body portion 441 and a fixing portion 442 provided to a radially outer side with respect to the body portion 441, as illustrated in FIG. 51. The fixing portion 442 of each of the foils 440 is fixed to the end surface 431 of the foil holder 430 by a suitable method such as welding. An end portion of the body portion 441 on one circumferential side (hereinafter referred to as "front end 441a") and an end portion of the body portion 441 on another circumferential side (hereinafter referred to as "rear end 441b") both form a herringbone pattern. Specifically, the front end 441a comprises a pair of inclined portions 441a1 inclined to the one circumferential side from both radial ends toward a radial center. An approximately arc-like top portion 441a2 is provided between the pair of inclined portions 441a1 so as to smoothly connect the inclined portions 441a1. The rear end 441b comprises a pair of inclined portions 441b1 inclined to the one circumferential side from both the radial ends toward the radial center. An approximately arc-like bottom portion 441b2 is provided between the pair of inclined portions 441b1 so as to smoothly connect the inclined portions 441b1.

Figure 52A:
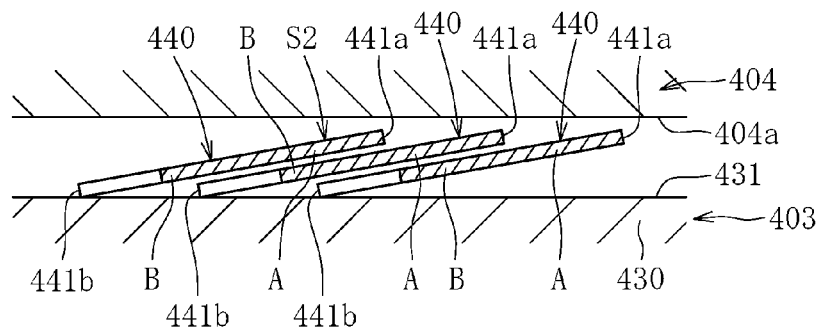
FIG. 52A is a sectional view for illustrating the thrust foil bearing illustrated in FIG. 49, for illustrating a state in which the shaft is stopped.

As illustrated in FIG. 52A, the front end 441a of the body portion 441 of each of the foils 440 is arranged on the body portion 441 of adjacent one of the foils 440 (thrust collar 404 side). A region including the front end 441a of each of the foils 440 forms the top foil portion A having the thrust bearing surface S2. The thrust bearing surfaces S2 of the plurality of foils 440 are provided continuously over the entire periphery in the circumferential direction. On the other hand, a region including the read end 441b of each of the foils 440 forms the back foil portion B configured to support the top foil portion A of the adjacent one of the foils 440 from behind (lower side). The back foil portion B of each of the foils 440 is arranged between the top foil portion A of the adjacent one of the foils 440 and the foil holder 430.

As illustrated in FIG. 51, the fragile portion P3 is formed on a radially intermediate portion of the back foil portion B of each of the foils 440. The fragile portion P3 has lower compressive strength in the radial direction than regions on both radial sides thereof. In this embodiment, a slit 441c extending in the circumferential direction is formed in the radially intermediate portion of the back foil portion B to lower the compressive strength of the fragile portion P3. Inner walls of the slit 441c, which face each other, are separated from each other in the radial direction. The slit 441c reaches the rear end 441b of the body portion 441. In the illustrated example, the slit 441c extends from the bottom portion 441b2 of the rear end 441b of the body portion 441 to the one circumferential side. The slit 441c does not reach the top foil portion A, and is formed within the region of the back foil portion B.

Figure 52B:
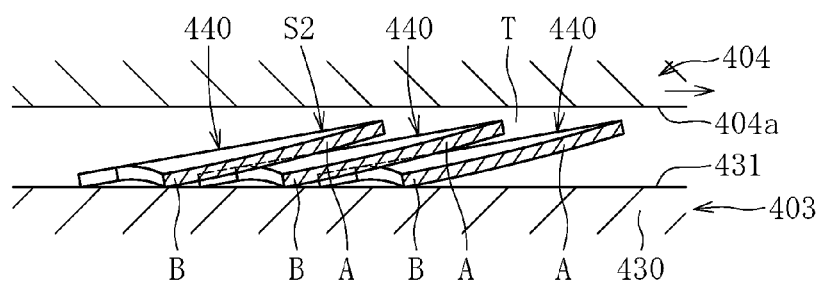
FIG. 52B is a sectional view for illustrating the thrust foil bearing illustrated in FIG. 49, for illustrating a state in which the shaft is rotated.
Figure 53:
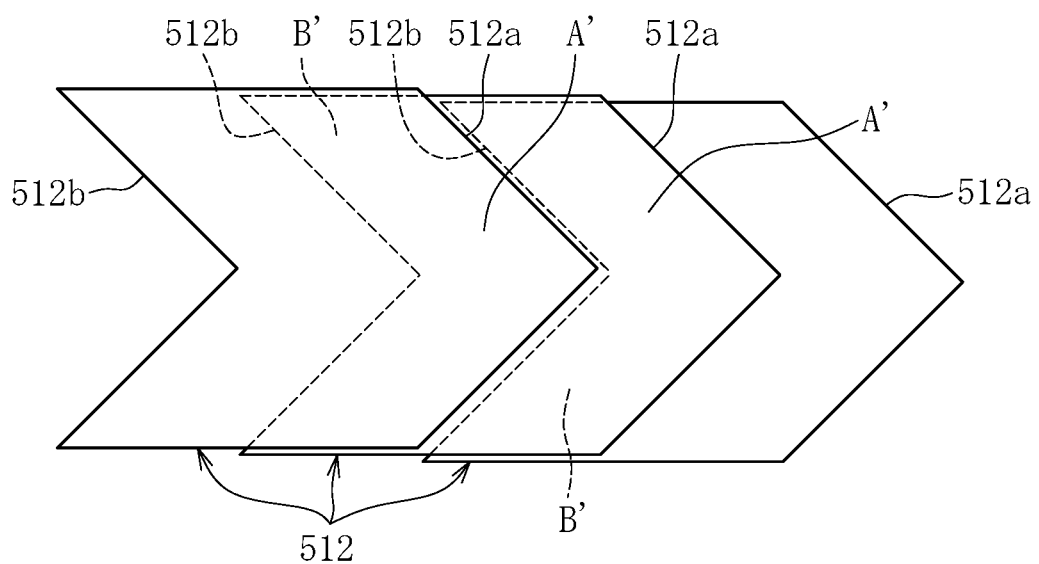
FIG. 53 is a plan view for illustrating a foil to be assembled into a related-art foil bearing.
Figure 54:
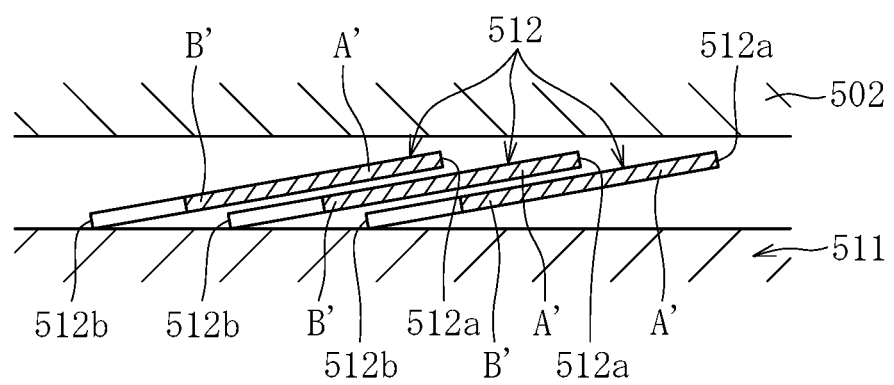
FIG. 54 is a sectional view for illustrating the foil bearing.
Figure 55:
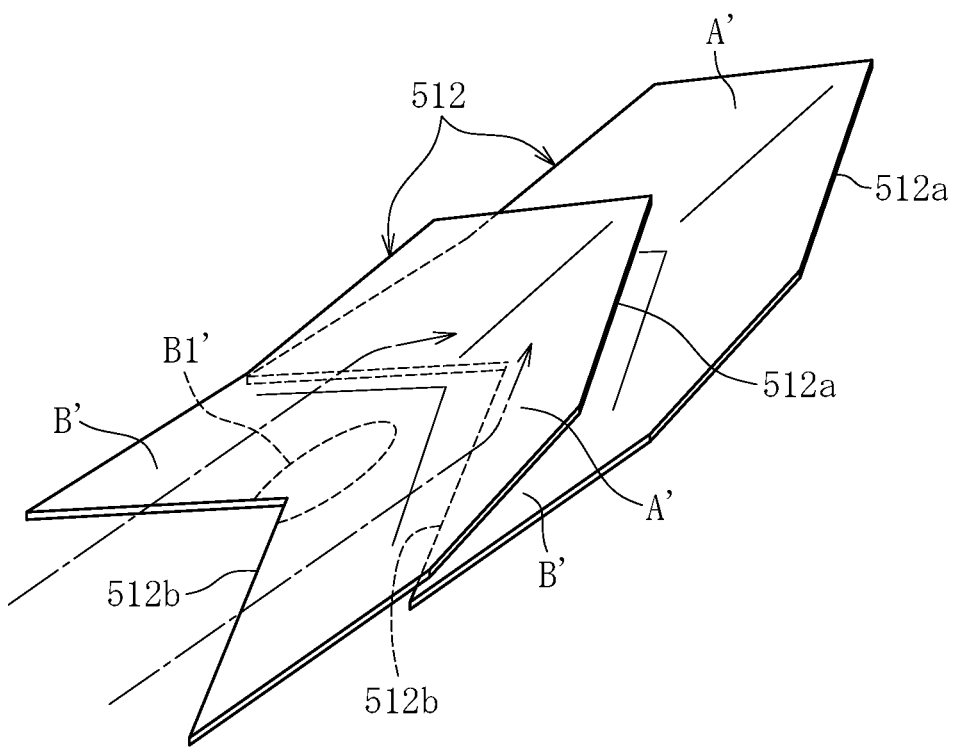
FIG. 55 is a perspective view for illustrating a state in which the foil illustrated in FIG. 53 is deformed into a boat-like shape.

When the shaft 402 is rotated, a pressure of the fluid (for example, air) in the thrust bearing gap T formed between the thrust bearing surface S2 of each of the foils 440 and the end surface 404a of the thrust collar 404 is increased, as illustrated in FIG. 52B. By the fluid pressure, the thrust collar 404 and the shaft 402 are supported in one of the thrust directions in a non-contact manner. At this time, each of the foils 440 is pressed to the lower side (foil holder 430 side) by the fluid pressure in the thrust bearing gap T. As a result, each of the foils 440 is deformed into a boat-like shape along the rear end 441b (inclined portions 441b1) having the herringbone pattern in the back foil portion B, which is arranged behind (on the lower side of) the foil 440 (not shown). Specifically, the top foil portion A of each of the foils 440, and the front end 441a and both radial ends are warped upward to the thrust collar 404 side. As a result, the fluid flowing in the thrust bearing gap T along with the rotation of the shaft 402 is collected to a radial center side along the top foil portion A, thereby efficiently increasing the fluid pressure in the radially intermediate portion.

When each of the foils 440 is deformed into the boat-like shape as described above, the compressive stress is applied to the radially intermediate portion of the back foil portion B from both the radial sides. In this embodiment, the fragile portion P3 is provided in the radially intermediate portion of the back foil portion B. Therefore, the fragile portion P3 is easily deformed under the above-mentioned compressive stress. Specifically, the inner walls of the slit 441c on both the radial sides come closer to each other to compressively deform the fragile portion P3 in the radial direction. As a result, even when a rotation speed of the shaft 402 is low, each of the foils 440 can be deformed into the boat-like shape to efficiently increase the fluid pressure in the thrust bearing gap T so as to support the shaft 402 in a non-contact manner.

Low-friction coating such as a DLC film, a titanium aluminum nitride film, a tungsten disulfide film, and a molybdenum disulfide film may be formed on one or both of the thrust bearing surface S2 of each of the foils 440 and the end surface 404a of the thrust collar 404. Further, the low-friction coating as described above may be formed on one or both of a lower surface of the foils 440 and the end surface 431 of the foil holder 430.

The present invention is not limited to the embodiments described above. For example, the fragile portion P3 is formed by forming the slit 421c in the back foil portion B of the foil 420 and the slit 441c in the back foil portion B of the foil 440 in the embodiments described above, but the formation of the fragile portion P3 is not limited thereto. For example, the fragile portion P may also be formed by forming a plurality of holes passing through the back foil portion in the thickness direction or partially thinning the back foil portion.

The foil bearing according to the present invention may be used not only as turbo machines such as the gas turbine and the supercharger, but widely used also as bearings for vehicles such as automobiles. The foil bearing according to the present invention may be widely used also as bearings for industrial devices.

The foil bearings described above are each an air dynamic pressure bearing that uses air as a pressure generating fluid. However, the present invention is not limited thereto, and other gases or liquids such as water and oil may be used as the pressure generating fluid.

Each of the foil bearings is fixed and the shaft is rotated in the above-mentioned embodiments according to the first to third aspects of the present invention, but the shaft may be fixed and each of the foil bearings may be rotated in contrast to the embodiments described above. When the foil bearing is rotated, however, the thin-film foils are likely to be deformed under the effects of a centrifugal force. Therefore, it is preferred that each of the foil bearings be fixed as in each of the embodiments described above.

The configurations of the above-mentioned embodiments of the first to third aspects of the present invention are appropriately combined.

REFERENCE SIGNS LIST 6 shaft
10 foil bearing unit
20 rotary member
21 sleeve portion
22 flange portion
30 radial foil bearing
31 foil holder
32 foil
40, 50 thrust foil bearing
41, 51 foil holder
41a, 51a holder body
41b, 51b fixing member
42, 52 foil
42a, 52a body portion
42b, 52b extended portion
60 foil member
61 coupling portion
70 radial foil bearing
71 foil holder
72 foil
80 foil member
81 coupling portion
S1 radial bearing surface
S2 thrust bearing surface
S3 thrust bearing surface

The invention claimed is:

1. A foil bearing, comprising:
a foil holder; and
a plurality of foils mounted to the foil holder so as to be arrayed in a circumferential direction of the foil holder,
wherein the foil bearing is configured to support a shaft in thrust directions of the shaft, the shaft being rotatable relative to one side in the circumferential direction,
wherein each of the plurality of foils comprises:
  a body portion having a thrust bearing surface; and
  an extended portion extending from the body portion to a radially outer side,
wherein an end portion of the body portion of each of the plurality of foils on one circumferential side is arranged so as to be overlapped on the body portion of an adjacent one of the plurality of foils,
wherein the extended portions of the plurality of foils are fixed onto the same plane of the foil holder, and
wherein, for each of the pluarity of foils, the extended portion extends from the body portion to the radially outer side in a direction inclined to another circumferential side.

2. A foil bearing comprising:
a foil holder; and
a plurality of foils mounted to the foil holder so as to be arrayed in a circumferential direction of the foil holder,
wherein the foil bearing is configured to support a shaft in thrust directions of the shaft, the shaft being rotatable relative to one side in the circumferential direction,
wherein each of the plurality of foils comprises:
  a body portion having a thrust bearing surface; and
  an extended portion extending from the body portion to a radially outer side,
wherein an end portion of the body portion of each of the plurality of foils on one circumferential side is arranged so as to be overlapped on the body portion of an adjacent one of the plurality of foils,
wherein the extended portions of the plurality of foils are fixed onto the same plane of the foil holder,
wherein the foil holder axially faces a thrust collar provided on the shaft,
wherein a region including the end portion of each of the plurality of foils on the one circumferential side forms a top foil portion having the thrust bearing surface,
wherein a region including an end portion of each of the plurality of foils on another circumferential side forms a back foil portion configured to support the top foil portion of an adjacent one of the pluarlity of foils form behind, wherein the foil bearing has a thrust bearing gap formed between the thrust bearing surfaces and an end surface of the thrust collar along with the relative rotation of the shaft, wherein the thrust bearing gap has a small gap portion formed between a region of the top foil portion of each of the plurality of foils, which includes an end portion of the top foil portion on the one circumferential side, and the end surface of the trust collar, wherein the thrust bearing gap has a small gap portion formed between a region of the top foil portion of each of the plurality of foils, which includes an end portion of the top foil portion on the one circumferential side, and the end surface of the trust collar, and wherein the foil bearing has a communication path configured to bring the large gap portion and a space between each of the plurality of foils and the foil holders into communication with each other.

3. The foil bearing according to claim 2,
wherein each of the plurality of foils has a cutout formed therein, and
wherein the cutouts form the communicatiosn paths.

4. A foil bearing comprising:
a foil holder; and
a plurality of foils mounted to the foil holder so as to be arrayed in a circumferential direction of the foil holder,
wherein the foil bearing is configured to support a shaft in thrust directions of the shaft, the shaft being rotatable relative to one side in the circumferential direction,
wherein each of the plurality of foils comprises:
  a body portion having a thrust bearing surface; and
  an extended portion extending from the body portion to a radially outer side,
wherein an end portion of the body portion of each of the plurality of foils on one circumferential side is arranged so as to be overlapped on the body portion of an adjacent one of the pluarity of foils,
wherein the extended portions of the plurality of foils are fixed onto the same plane of the foil holder,
wherein a region including the end portion of each of plurality of the foils on the one circumferential side forms a top foil portion having the thrust bearing surface,
wherein a region including an end portion of each of the plurality of foils on another circumferential side forms a back foil portion configured to support the top foil portion of an adjacent one of the plurality of foils from behind,
wherein the end portion of each of the plurality of foils on the another circumferential side comprises a pair of inclined portions extending from both radial end sides toward a radial center so as to be inclined to the one circumferential side, and
wherein the back foil portion of each of the plurality of foils comprises a fragile portion formed in a radially intermediate portion thereof and having lower strength to a compressive stress than regions on both radial sides of the fragile portion.

5. The foil bearing according to claim 4, wherein each of the fragile portions is formed by forming a slit extending in the circumferential direction in the back foil portion.

6. A foil bearing comprising:
a foil holder; and
a plurality of foils mounted to an inner peripheral surface of the foil holder so as to be arrayed in a circumferential direction of the foil holder,
wherein the foil bearing is configured to support a shaft in a radial direction of the shaft, the shaft being rotatable relative to one side in the circumferential direction,
wherein each of the plurality of foils comprises:
  a body portion having a radial bearing surface; and
  an extended portion extending from the body portion to one axial side,
wherein an end portion of the body of each of the plurality of foils on one circumferential side is arranged so as to be overlapped on the body portion of an ajacent one of the plurality of foils,
wherein the extended portions of the plurality of foils are fixed onto the same cylindrical surface of the foil holder, and
wherein, for each of the plurality of foils, the extended portion from the body portion to the one axial side in a direction inclined to another circumferential side.

7. A foil bearing, comprising:
a foil holder; and
a plurality of foils mounted to an inner peripheral surface of the foil holder so as to be arrayed in a circumferential direction of the foil holder,
wherein the foil bearing being configured to support a shaft in a radial direction of the shaft, the shaft being rotatable relatively to one side in the circumferential direction,
wherein each of the plurality of foils comprising:
  a body portion having a radial bearing surface; and
  an extended portion extending from the body portion to one axial side,
wherein an end portion of the body portion of the each of the plurality of foils on one circumferential side being arranged so as to be overlapped on the body portion of adjacent one of the plurality of foils,
wherein the extended portions of the plurality of foils being fixed onto the same cylindrical surface of the foil holder,
wherein a region including the end portion of each of the plurality of foils on the one circumferential side forms a top foil portion having the radial bearing surface,
wherein a region including an end portion of each of the plurality of foils on another circumferential side forms a back foil portion configured to support the top foil portion of an adjacent one of the plurality of foils from behind,
wherein the foil bearing a radial bearing gap formed between the radial bearing surfaces and an outer peripheral surface of the shaft along with the relative rotation of the shaft,
wherein the radial beairng gap has a small gap portion formed between a region of the top foil portion of each of the plurality of foils, which includes an end portion of the top foil portion on the one circumferential side, and the outer peripheral surface of the shaft,
wherein the radial bearing gap has a large gap portion formed between a region of the top foil portion of each of the plurality of foils, which includes an end portion of the top foil portion on the another circumferential side, and the outer peripheral surface of the shaft, and
wherein the foil bearing has a communication path configured to bring the large gap portion and a space between each of the plurality of foils and the foil holder into communication with each other.

8. The foil bearing according to claim 7,
wherein each of the plurality of foils has a cutout formed therein, and
wherein the cutouts form the communication paths.

9. The foil bearing according to claim 7,
a foil holder; and
a plurality of foils mounted to an inner peripheral surface of the foil holder so as to be arrayed in a circumferential direction of the foil holder,
wherein the foil bearing being configured to support a shaft in a radial direction of the shaft, the shaft being rotatable relatively to one side in the circumferential direction,
wherein each of the plurality of foils comprising:
a body portion having a radial bearing surface; and
an extended portion extending from the body portion to one axial side,
wherein an end portion of the body portion of the each of the plurality of foils on one circumferential side being arranged so as to be overlapped on the body portion of adjacent one of the plurality of foils,
wherein the extended portions of the plurality of foils being fixed onto the same cylindrical surface of the foil holder,
wherein a region including the end portion of each of the plurality of foils on the one circumferential side forms a top foil portion having the radial bearing surface,
wherein a region including an end portion of each of the plurality of foils on another circumferential side forms a back foil portion configured to support the top foil portion of an adjacent one of the plurality of foils from behind,
wherein the end portion of each of the plurality of foils on the another circumferential side comprises a pair of inclinded portions extending form bother axial end sides toward an axial center so as to be inclined to the one circumferential side, and
wherein the back foil portion of each of the plurality of foils comprises a fragile portion formed in an axially intermediate portion thereof and having lower strenth to a compressive stress than regions on both axial sides of the fragile portion.

10. The foil bearing according to claim 9, wherein each of the fragile portions is formed by forming a slit extending in the circumferential direction in the back foil portion.

11. A method of manufacturing a foil bearing configured to support a shaft in thrust directions of the shaft, the shaft being rotatable relatively to one side in a circumferential direction of the shaft, the method comprising the steps of:
forming a plurality of foil members, each of the plurality of foil members comprising a plurality of foils, each of the plurality of foils comprising a body portion having a thrust bearing surface and an extended portion extending from the body portion to a radially outer side, and a coupling portion provided on a radially outer side with respect to the plurality of foils and configured to couple the extended portions of the plurality of foils;
overlapping the plurality of foil members so that an end portion of the body portion of each of the plurality of foil members on one circumferential side is arranged so as to be overlapped on the body portion of an adjacent one of the plurality of foil members;
fixing the extended portions of the plurality of foil members onto the same plane of a foil holder; and
separating the coupling portions of the plurality of foil members from the plurality of foils,
the steps being carried out in the stated order.

12. The method of manufacturing a foil bearing according to claim 11, wherein a circumferential dimension of a boundary between the coupling portion and the extended portion of each of the plurality of foil members is smaller than a circumferential dimension of a radially outer rim of the extended portion.

13. A method of manufacturing a foil bearing configured to support a shaft in a radial direction of the shaft, the shaft being rotatable relatively to one side in a circumferential direction of the shaft, the method comprising the steps of:
forming a plurality of foil members, each of the plurality of foil members comprising a plurality of foils, each of the plurality of foils comprising a body portion having a radial bearing surface and an extended portion extending from the body portion to one axial side, and a coupling portion configured to couple the extended portions of the plurality of foils;
overlapping the plurality of foil members so that an end portion of the body portion of each of the plurality of foil members on one circumferential side is arranged so as to be overlapped on the body portion of an adjacent one of the plurality of foil members;
fixing the extended portions of the plurality of foil members onto the same cylindrical surface of a foil holder; and
separating the coupling portions of the plurality of foil members from the plurality of foils,
the steps being carried out in the stated order.

14. The method of manufacturing a foil bearing according to claim 13, wherein a circumferential dimension of a boundary between the coupling portion and the extended portion of each of the plurality of foil members is smaller than a circumferential dimension of an end portion of the extended portion on the one axial side.

* * * * *